(12) United States Patent
Elshafie et al.

(10) Patent No.: US 11,924,840 B2
(45) Date of Patent: Mar. 5, 2024

(54) FEEDBACK FOR MIXED GRANT TYPES

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 17/447,728

(22) Filed: Sep. 15, 2021

(65) Prior Publication Data

US 2022/0086887 A1    Mar. 17, 2022

Related U.S. Application Data

(60) Provisional application No. 63/078,868, filed on Sep. 15, 2020.

(51) Int. Cl.
*H04W 72/04* (2023.01)
*H04L 5/00* (2006.01)
*H04W 72/1273* (2023.01)
*H04W 72/21* (2023.01)
*H04W 72/23* (2023.01)
*H04W 72/566* (2023.01)

(52) U.S. Cl.
CPC .......... *H04W 72/21* (2023.01); *H04L 5/0055* (2013.01); *H04W 72/1273* (2013.01); *H04W 72/23* (2023.01); *H04W 72/569* (2023.01)

(58) Field of Classification Search
CPC . H04W 72/21; H04W 72/1273; H04W 72/23; H04W 72/569; H04W 72/20; H04L 5/0055; H04L 5/0094; H04L 5/0053; H04L 5/0044
See application file for complete search history.

(56) References Cited

U.S. PATENT DOCUMENTS

| | | | |
|---|---|---|---|
| 2016/0330011 A1* | 11/2016 | Lee ........................ | H04W 52/10 |
| 2018/0006791 A1* | 1/2018 | Marinier ................ | H04L 1/1893 |
| 2020/0214084 A1* | 7/2020 | Panteleev ............. | H04W 76/27 |
| 2020/0252168 A1* | 8/2020 | Kim ..................... | H04W 72/535 |
| 2021/0067276 A1* | 3/2021 | Wang .................... | H04L 1/1861 |
| 2022/0039088 A1* | 2/2022 | Zhang ................... | H04L 1/0031 |
| 2022/0159691 A1* | 5/2022 | Chen ..................... | H04L 1/1812 |
| 2023/0106098 A1* | 4/2023 | Wang ................. | H04W 72/0453 370/329 |
| 2023/0180283 A1* | 6/2023 | Al-Imari ........... | H04W 72/1268 370/329 |

\* cited by examiner

*Primary Examiner* — Mahbubul Bar Chowdhury
(74) *Attorney, Agent, or Firm* — Sevan Savsa; Norton Rose Fulbright US LLP

(57) ABSTRACT

This disclosure provides systems, methods, and devices for wireless communication that support feedback for mixed grant types. In a first aspect, a user equipment (UE) is configured to determine a threshold associated with a number of bits for feedback of one or more physical downlink shared channel (PDSCH) grant types. The UE is further configured to transmit a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold. Other aspects and features are also claimed and described.

30 Claims, 5 Drawing Sheets

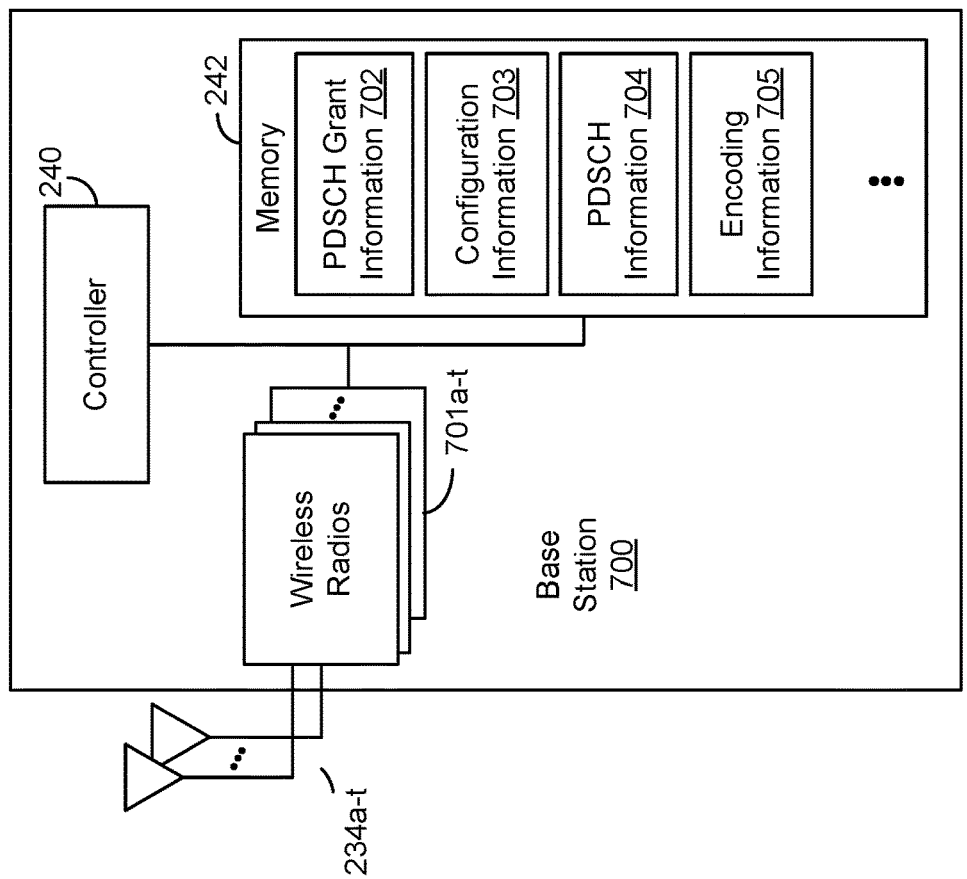
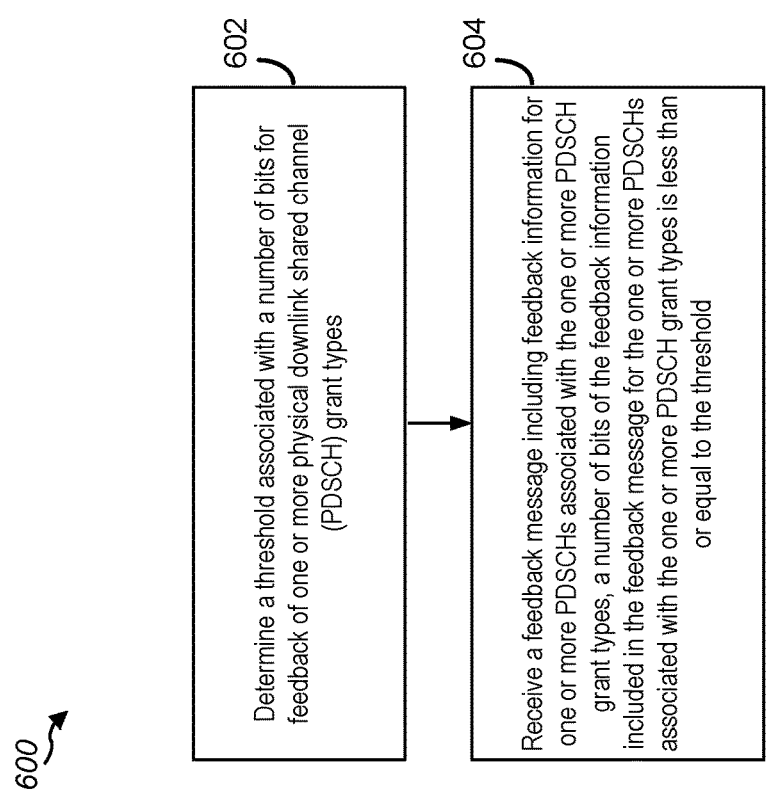
*FIGURE 7*
*FIGURE 6*

FEEDBACK FOR MIXED GRANT TYPES

CROSS-REFERENCE TO RELATED APPLICATIONS

This application claims the benefit of U.S. Provisional Patent Application No. 63/078,868, entitled, "FEEDBACK FOR MIXED GRANT TYPES," filed on Sep. 15, 2020, which is expressly incorporated by reference herein in its entirety.

TECHNICAL FIELD

Aspects of the present disclosure relate generally to wireless communication systems, and more particularly, to feedback for mixed grant types, such as reduced hybrid automatic repeat request (HARQ)-acknowledgement (ACK) feedback for mixed grant types.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A UE may receive one or more physical downlink shared channels (PDSCHs) based on one or more grants. For example, the UE may receive one or more grants, such as a semi-persistent scheduling (SPS) grant, a dynamic grant (DG), or a combination thereof. For each PDSCH received by the UE, the UE generates feedback, such as acknowledge/negative-acknowledge (ACK/NACK) feedback, channel state information (CSI), or a combination thereof, as illustrative, non-limiting examples, to be provided to a base station in an uplink communication, such as a physical uplink control channel (PDCCH). A size of the uplink communication may vary based on a number for received PDSCHs for which the UE provides feedback. When the UE receives multiple PDSCHs, such as PDSCHs associated with multiple grants, the feedback may exceed an available size of the uplink communication, such as a size of the slot of the uplink communication. When the feedback to be sent exceeds the available size of the uplink communication, the UE may defer sending a portion of the feedback until a later uplink communication. However, deferring the sending of the feedback for one or more PDSCHs delays a base station from receiving timely feedback and limits the base station's ability to timely react to the feedback. To illustrate, by the time the base station receives feedback that has been deferred, a portion of the feedback, such as CSI, may be stale or inapplicable based on changing channel conditions. Additionally, the UE typically provides feedback for PDSCHs in an order in which the PDSCHs were received, which lacks flexibility, has a high overhead cost, and reduces system efficiency.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes determining a threshold associated with a number of bits for feedback of one or more physical downlink shared channel (PDSCH) grant types. The method further includes transmitting a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold.

Another innovative aspect of the subject matter described in this disclosure can be implemented in a UE. The UE includes at least one processor and a memory coupled with the at least one processor and storing processor-readable instructions that, when executed by the at least one processor, is configured to determine a threshold associated with a number of bits for feedback of one or more PDSCH grant types. The processor-readable instructions are further configured to initiate transmission of a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold.

Another innovative aspect of the subject matter described in this disclosure can be implemented in an apparatus configured for wireless communication. The apparatus includes means for determining a threshold associated with a number of bits for feedback of one or more PDSCH grant types. The apparatus also includes means for transmitting a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold.

Another innovative aspect of the subject matter described in this disclosure can be implemented in a non-transitory computer-readable medium storing instructions that, when executed by a processor, cause the processor to perform operations including determining a threshold associated with a number of bits for feedback of one or more PDSCH grant types. The operations further include initiating transmission of a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold.

Another innovative aspect of the subject matter described in this disclosure can be implemented in an apparatus configured for wireless communication. The apparatus includes an interface configured for wireless communication and a processor system coupled to the interface. The processor system is configured to determine a threshold associated with a number of bits for feedback of one or more PDSCH grant types. The interface is configured to transmit a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold.

Another innovative aspect of the subject matter described in this disclosure can be implemented in a method of wireless communication performed by a base station. The method includes determining a threshold associated with a number of bits for feedback of one or more PDSCH grant types. The method further includes receiving a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold.

Another innovative aspect of the subject matter described in this disclosure can be implemented in a base station. The base station includes at least one processor and a memory coupled with the at least one processor and storing processor-readable instructions that, when executed by the at least one processor, is configured to determine a threshold associated with a number of bits for feedback of one or more PDSCH grant types. The processor-readable instructions are further configured to receive a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold.

Another innovative aspect of the subject matter described in this disclosure can be implemented in an apparatus configured for wireless communication. The apparatus includes means for determining a threshold associated with a number of bits for feedback of one or more PDSCH grant types. The apparatus also includes means for receiving a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold.

Another innovative aspect of the subject matter described in this disclosure can be implemented in a non-transitory computer-readable medium storing instructions that, when executed by a processor, cause the processor to perform operations including determining a threshold associated with a number of bits for feedback of one or more PDSCH grant types. The operations further include receiving a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold.

Another innovative aspect of the subject matter described in this disclosure can be implemented in an apparatus configured for wireless communication. The apparatus includes an interface configured for wireless communication and a processor system coupled to the interface. The processor system is configured to determine a threshold associated with a number of bits for feedback of one or more PDSCH grant types. The interface is configured to receive a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example process that supports feedback for mixed grant types according to one or more aspects.

FIG. 7 is a block diagram of an example base station that supports feedback for mixed grant types according to one or more aspects.

Like reference numbers and designations in the various drawings indicate like elements.

DETAILED DESCRIPTION

Figure 1:
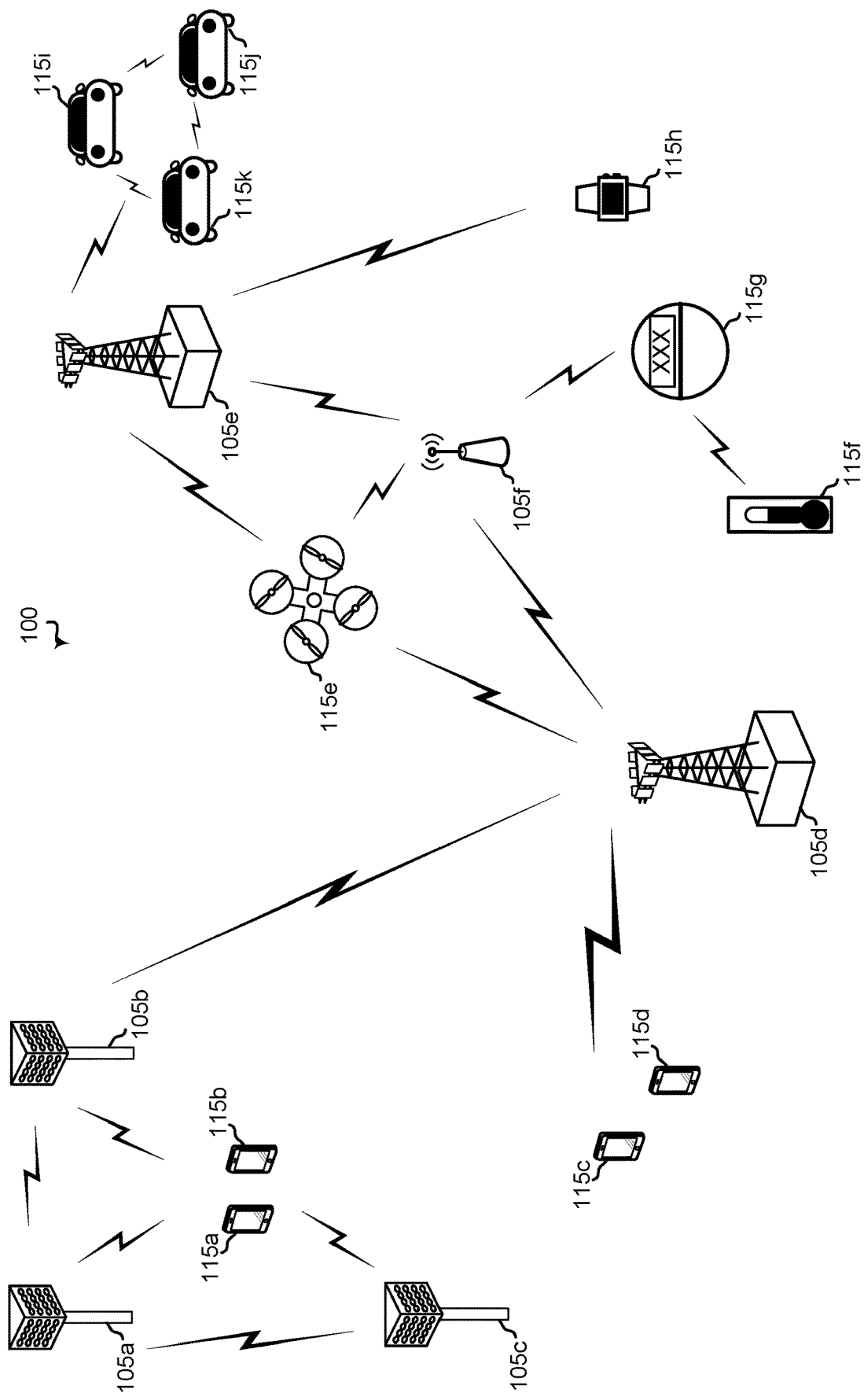
FIG. 1 is a block diagram illustrating details of an example wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support feedback for mixed grant types. To illustrate, a user equipment (UE) may receive, from a base station, a feedback configuration associated with one or more physical downlink shared channel (PDSCH) grant types. The feedback configuration may indicate a threshold, such as a maximum number of bits allocated for feedback information for the one or more received PDSCHs associated with the one or more PDSCH grant types. Additionally, or alternatively, the feedback configuration may indicate the one or more PDSCH grant types, a format of feedback information, an encoding scheme, whether to discard or maintain a stored feedback report of a received PDSCH based on transmission of the feedback message, whether to discard or use one or more remaining available bits of the feedback information, or a combination thereof, as illustrative, non-limiting examples. Additionally, the UE may receive one or more PDSCHs from the base station and, for each received PDSCH, generate and store a feedback report that indicates an acknowledge/negative-acknowledge (ACK/NACK) status, channel state information (CSI), or a combination thereof. In some implementations, the UE may store one or more feedback reports based on a priority associated with multiple PDSCH grant types, such as a dynamic grant type, one or more semi-persistent scheduling (SPS) grant types, or a combination thereof, as illustrative, non-limiting examples.

The UE may generate a feedback message based on the feedback configuration. For example, the UE may determine the threshold based on the feedback configuration, such as a threshold associated with a number of bits for feedback of one or more PDSCH grant types, such as an SPS grant type, a dynamic PDSCH grant type, or a combination thereof. The feedback message may include feedback information for one or more received PDSCHs associated with the one or more PDSCH grant types. A number of bits of the feedback information included in the feedback message for the one or more received PDSCHs associated with the one or more PDSCH grant types is less than or equal to the threshold. The UE may transmit the feedback message to the base station. For example, the feedback message may include or correspond to a physical uplink control channel (PUCCH).

Particular implementations of the subject matter described in this disclosure can be implemented to realize one or more of the following potential advantages. In some aspects, the present disclosure provides feedback for mixed grant types, such as an SPS grant type, a dynamic PDSCH grant type, or a combination thereof. For example, the present disclosure may reduce hybrid automatic repeat request (HARQ)-acknowledgement (ACK) feedback for mixed grant types. To illustrate, the present disclosure provides a feedback configuration that may be used by a UE to generate a feedback message. By generating the feedback message based on the feedback configuration, the UE may limit or control a size of the feedback message and the UE may provide timely feedback for one or more PDSCHs to a base station, which enables the base station to react to the feedback and changing channel conditions. In some aspects, the UE may also store one or more feedback reports for received PDSCHs according to a priority scheme and generate the feedback message based on the one or more stored feedback reports. By utilizing the priority scheme, the UE may generate a feedabck message that includes feedback for high priority PDSCHs before low priority PDSCHs and can defer or drop feedback reports of one or more low priority PDSCHs that were not included in the feedback message. Additionally, the feedback configuration indicated by the base station provides flexibility to the format of feedback information, which may reduce an overhead cost of PDSCH feedback and improve system efficiency.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments or uses may come about via integrated chip embodiments or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired links, wireless communication links, or a combination thereof.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
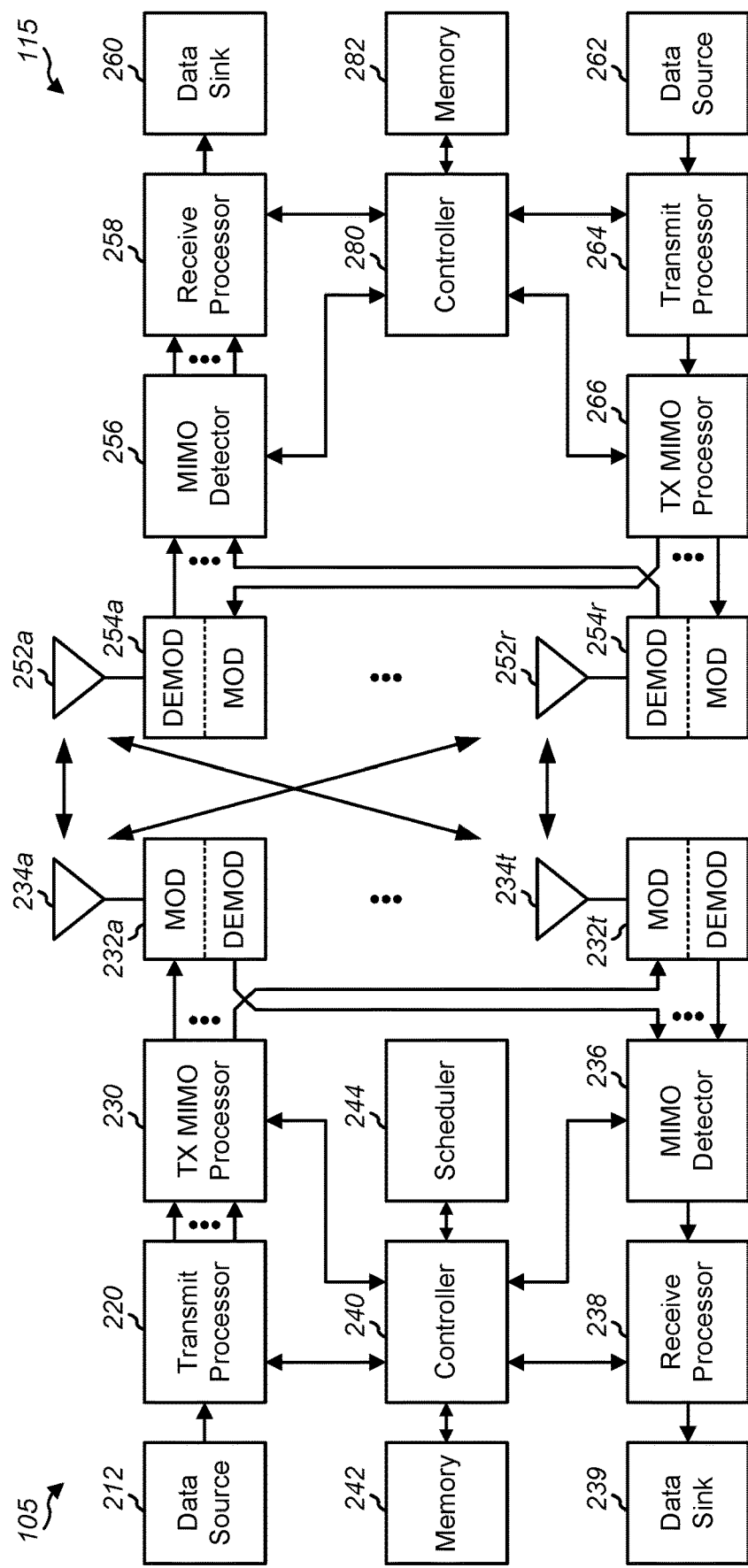
FIG. 2 is a block diagram conceptually illustrating a design of a base station and a user equipment (UE).

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, the reference symbols, or a combination thereof, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 or other processors and modules at base station 105, controller/processor 280 or other processors and modules at UE 115, or a combination thereof may perform or direct the execution of various processes for the techniques described herein, such as to perform or direct the execution illustrated in FIGS. 4 and 6, or other processes for the techniques described herein. Memories 242 and 282 may store data and program codes for base station 105 and UE 115, respectively. Scheduler 244 may schedule UEs for data transmission on the downlink, the uplink, or both.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

The present disclosure provides systems, apparatus, methods, and computer-readable media that support feedback for mixed grant types. To illustrate, a UE may receive, from a base station, a feedback configuration associated with one or more PDSCH grant types. The feedback configuration may indicate a threshold, such as a maximum number of bits allocated for feedback information for the one or more received PDSCHs associated with the one or more PDSCH grant types. Additionally, or alternatively, the feedback configuration may indicate the one or more PDSCH grant types, a format of feedback information, an encoding scheme, whether to discard or maintain a stored feedback report of a received PDSCH based on transmission of the feedback message, whether to discard or use one or more remaining available bits of the feedback information, or a combination thereof, as illustrative, non-limiting examples. Additionally, the UE may receive one or more PDSCHs from the base station and, for each received PDSCH, generate and store a feedback report that indicates an ACK/NACK status, CSI, or a combination thereof. In some implementations, the UE may store one or more feedback reports based on a priority associated with multiple PDSCH grant types, such as a dynamic grant type, one or more SPS grant types, or a combination thereof, as illustrative, non-limiting examples.

The UE may generate a feedback message based on the feedback configuration. For example, the UE may determine the threshold based on the feedback configuration, such as a threshold associated with a number of bits for feedback of one or more PDSCH grant types, such as an SPS grant type, a dynamic PDSCH grant type, or a combination thereof. The feedback message may include feedback information for one or more received PDSCHs associated with the one or more PDSCH grant types. A number of bits of the feedback information included in the feedback message for the one or more received PDSCHs associated with the one or more PDSCH grant types is less than or equal to the threshold. The UE may transmit the feedback message to the base station. For example, the feedback message may include or correspond to a PUCCH.

Particular implementations of the subject matter described in this disclosure can be implemented to realize one or more of the following potential advantages. In some aspects, the present disclosure provides feedback for mixed grant types, such as an SPS grant type, a dynamic PDSCH grant type, or a combination thereof. For example, the present disclosure may reduce HARQ-ACK feedback for mixed grant types. To illustrate, the present disclosure provides a feedback configuration that may be used by a UE to generate a feedback message. By generating the feedback message based on the feedback configuration, the UE may limit or control a size of the feedback message and the UE may provide timely feedback for one or more PDSCHs to a base station, which enables the base station to react to the feedback and changing channel conditions. In some aspects, the UE may also store one or more feedback reports for received PDSCHs according to a priority scheme and generate the feedback message based on the one or more stored feedback reports. By utilizing the priority scheme, the UE may generate a feedabck message that includes feedback for high priority PDSCHs before low priority PDSCHs and can defer or drop feedback reports of one or more low priority PDSCHs that were not included in the feedback message. Additionally, the feedback configuration indicated by the base station provides flexibility to the format of feedback information, which may reduce an overhead cost of PDSCH feedback and improve system efficiency.

Figure 3:
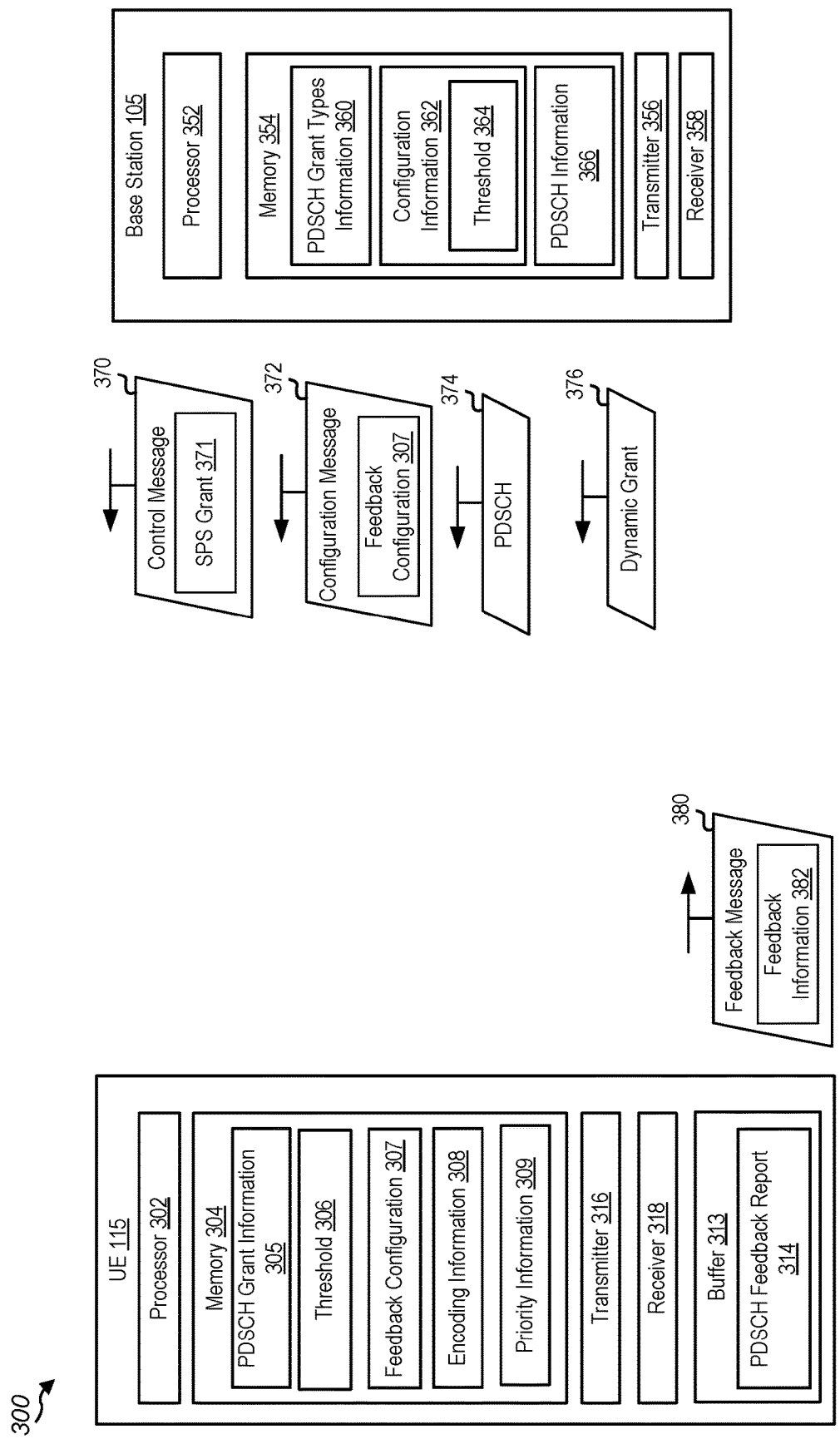
FIG. 3 is a block diagram illustrating an example wireless communication system that supports feedback for mixed grant types according to one or more aspects.

FIG. 3 is a block diagram of an example wireless communications system 300 that supports feedback for mixed grant types according to some aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 can include a variety of components (such as structural, hardware components) used for carrying out one or more functions described herein. For example, these components can include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and a buffer 313. Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes PDSCH grant information 305, one or more thresholds 306 (hereinafter referred to collectively as "threshold 306"), a feedback configuration 307, encoding information 308, and priority information 309. PDSCH grant information 305 may indicate one or more PDSCH grant types (or one or more PDSCH grants) received by UE 115. For example, the one or more PDSCH grant types may include one or more SPS grant types, a dynamic PDSCH grant type, or a combination thereof. In some implementations, the one or more PDSCH grants types include a first SPS grant type associated with a first SPS grant having a first configuration and a second SPS grant type associated with a second SPS grant having a second configuration.

An SP grant type may include an SPS PDSCH configuration that is typically associated with voice over Internet protocol (IP) communications or other periodic communications in which the UE 115 is assigned or granted times to receive downlink communications. To illustrate, an SPS PDSCH configuration may be configured with a periodicity p, which defines the time between two SPS PDSCH occasions (OCCs), and a parameter K1 which indicates the control channel PUCCH grant time in time slots that UE 115 should send feedback, such as HARQ-ACK, after receiving a PDSCH during a PDSCH occasion. If a time slot when UE 115 should send the feedback after receiving the PDSCH is unavailable—e.g., there is a collision with a granted downlink (DL) transmission (or mismatch between the uplink (UL) time configuration and a time division duplex (TDD) configuration), UE 115 may defer the feedback until a subsequent UL grant (e.g., PUCCH). Different SPS PDSCH configurations may different periodicity p, different parameters K1, or a combination thereof. The SPS PDSCH configuration may be received at the UE via a control message, such as a radio resource control (RRC) message, a medium access control-control element (MAC-CE), or DCI. A dynamic grant type may include a dynamic grant (DG) that is included in downlink control information (DCI). The DG may include information that includes a location or time slot for a PDSCH. Additionally, or alternatively, the DG may indicate a location or time slot in which UE 115 is to send feedback information, such as HARQ ACK information.

PDSCH grant information 305 may also indicate a size, a format, or both of a feedback report for a PDSCH. The size, the format, or both may be indicated or configured through an RRC message, a MAC-CE, or DCI. The size, the format, or both may be the same or different for different PDSCH grant types. For example, a first SPS PDSCH configuration and a second SPS PDSCH configuration may have the same size or different size feedback reports.

Threshold 306 may indicate a number of bits of feedback information for one or more PDSCH grant types. For example, threshold 306 may indicate a maximum number of bits, or an upper bound for a total size, allocated for the feedback information for the one or more received PDSCHs associated with the one or more PDSCH grant types.

Feedback configuration 307 may include or indicate a configuration for providing feedback information for one or more PDSCH grant types. In some implementations, feedback configuration 307 may include or indicate threshold 306. Additionally, or alternatively, feedback configuration 307 may indicate the one or more PDSCH grant types, a format of feedback information, an encoding scheme, whether to discard or maintain a stored feedback report of a received PDSCH based on transmission of the feedback message, whether to discard or use one or more remaining available bits of the feedback information, or a combination thereof, as illustrative, non-limiting examples. UE 115 may receive feedback configuration via an RRC message or an MAC-CE. Additionally, or alternatively, UE 115 may receive a portion of feedback configuration 307, such as the one or more PDSCH grant types, the format of the feedback information, whether to discard or maintain a stored feedback report of a received PDSCH based on transmission of a feedback message, whether to use or discard one or more remaining available bits of the feedback information, or a combination thereof, via DCI.

Encoding information 308 may include one or more tables, such as one or more mapping tables, or one or more schemes to encode data. For example, encoding information 308 may be used to bundle, combine, or compress data, such as feedback information, at least a portion of one or more feedback reports, or a combination thereof.

Priority information 309 include a priority or ranking of PDSCH grant types. In some implementations may be included in the feedback configuration 307. UE 115 may receive priority information, or an indication thereof, via an RRC message, a MAC-CE, or DCI. UE 115 may use priority information 309 to store one or more feedback reports for received PDSCHs according to a priority scheme and generate the feedback message based on the one or more stored feedback reports. In some implementations, grants with the same priority may be treated similarly.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Buffer 313 is configured to store one or more feedback reports, such as one or more PDSCH feedback reports 314 (hereinafter referred to collectively as "PDSCH feedback report 314"). PDSCH feedback report 314 may include an ACK/NACK status, CSI, or a combination thereof. The ACK/NACK may indicate whether a received PDSCH passed or failed a cyclic redundancy check (CRC). The CSI may include a channel quality indicator (CQI), channel rank, power information, block error rate (BLER), bit error rate (BER), or a combination thereof, as illustrative, non-limiting examples. It is noted that if UE 115 does not receive PDSCH, e.g., no data is received for an SPS occasion, UE 115 does not generate a PDSCH feedback report for the SPS occasion. In some implementations, buffer 313 may store PDSCH feedback report 314 based on or according to priority information 309. In some implementations, PDSCH feedback report 314 may be maintained in buffer 313 for a time period, such as a time period based on a number of slots or a time period that corresponds to a number of uplink grants (e.g., PUCCH). For example, if PDSCH feedback report 314 is not used as part of a feedback message for a number of uplink grants, such as 3 or 4 uplink grants, PDSCH feedback report 314 may be discarded (e.g., dropped).

Base station 105 can include a variety of components (such as structural, hardware components) used for carrying out one or more functions described herein. For example, these components can include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 242 includes PDSCH grant types information 360, configuration information 362, and PDSCH information 366. PDSCH grant types information 360 indicates one or more PDSCH grant types that may be used to communicate PDSCH to UE 115. In some implementations, PDSCH grant types information 360 includes or corresponds to PDSCH grant information 305. Configuration information 362 may include one or more thresholds 364 (hereinafter referred to collectively as "threshold 364"). Threshold 364 may include or correspond to threshold 306. Additionally, or alternatively, configuration information 362 may include or correspond to feedback configuration 307, encoding information 308, priority information 309, or a combination thereof. PDSCH information 366 may include a log or a record of PDSCHs transmitted to UE 115. In some implementations, base station 105 may track the PDSCHs based on feedback configuration 307, priority information 309, a feedback message received from UE 115, or a combination thereof.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G New Radio (NR) network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 transmits a control message 370 to UE 115. In some implementations, control message 370 includes or corresponds to an RRC message or a MAC-CE. Control message 370 includes one or more SPS grants, such as representative SPS grant 371. In some implementations, control message includes PDSCH grant information 305. UE 115 may receive control message 370 and update PDSCH grant information based on control message 370.

Base station 105 transmits configuration message 372, which include feedback configuration 307. In some implementations, configuration message 372 includes or corresponds to an RRC message or a MAC-CE. Configuration message 372 may be include in the same message or a different message as control message 370. Configuration message 372 includes threshold 306, feedback configuration 307, or a combination thereof. In some implementations, configuration message 372 includes one or more indicators associated with feedback configuration 307. UE 115 may receive configuration message 372 and store or update feedback configuration 307 based on configuration message 372.

In some implementations, base station 105 transmits one or more indicators to indicate the feedback configuration 307. For example, base station 105 may include the one or more indicators in the configuration message 372. Additionally, or alternatively, at least one of the one or more indicators may be determined or selected by base station 105. For example, base station may determine or select the at least one indicator based on channel conditions, received feedback information from UE 115, scheduled PDSCH, parameters of a grant, such as an SPS grant, or a combination thereof. The one or more indicators may include a first indicator, a second indicator, a third indicator, a fourth indicator, a fifth indicator, a six indicator, or a combination thereof. The first indicator may indicate threshold 306. The second indicator may indicate whether the one or more PDSCH grant types includes a SPS grant type or a SPS grant type and a dynamic grant type. In some implementations, the second indicator indicates a mode, such as a first mode in which threshold 306 is associated with a size, such as an upper bound, of feedback information for one or more dynamic grants and one or more SPS grants, or a second mode in which threshold 306 is associated with a size, such as an upper bound of feedback information of one or more SPS grants and no dynamic grants. The third indicator may indicate a format of the feedback information. For example, the format may indicate that ACK/NACK information is provided before CSI information. As another example, the format may indicate that the feedback information, or a portion thereof, is to be encoded using an encoding scheme. The fourth indicator may indicate an encoding scheme, such as the encoding scheme associated with the third indicator. The encoding scheme may include or correspond to encoding information 308. In some implementations, the encoding scheme include bundle encoding, combining encoding, or joint encoding of at least a portion of one or more PDSCH feedback reports. The fifth indicator may indicate whether to, based on transmission of the feedback message, discard or maintain a stored feedback report of a received PDSCH when the feedback message is generated independent of the stored feedback report. The sixth indicator may indicate whether to discard one or more remaining available bits of the feedback information or to use the one or more remaining available bits to indicate at least a portion of a feedback report of a received PDSCH associated with the one or more PDSCH grant types.

In some implementations, the first indicator, the second indicator, the third indicator, the fifth indicator, the sixth indicator, or a combination thereof, may be included in DCI. In some implementations, one or more indicators included in DCI may be transmitted to update feedback configuration of UE 115.

Base station 105 may transmit one or more PDSCH 374 to UE 115. For example, the one or more PDSCH 374 may be associated with SPS grant 371. Additionally, or alternatively, base station 105 may transmit a dynamic grant 376 to UE 115. Base station 105 may also send one or more PDSCHs associated with dynamic grant 376. UE 115 may receive dynamic grant 376 and update PDSCH grant information based on dynamic grant 376. In some implementations, for each PDSCH transmitted by base station 105, base station 105 may update PDSCH information 366.

UE 115 may receive one or more PDSCHs, such as PDSCH 374, from base station 105.

For each received PDSCH, base station may generate PDSCH feedback report 314 that is stored in buffer 313. In some implementations, UE 115 stores PDSCH feedback report 314 in buffer 313 based on priority information. Additionally, or alternatively, buffer 313 may include multiple buffers or be divided into a first portion and a second portion. A first buffer or first portion may be configured to store PDSCH feedback reports that may be reported—e.g., have satisfied a corresponding parameter K1—and the second buffer or second portion may be configured to store PDSCH feedback reports that are not ready to be reported— e.g., have not satisfied a corresponding parameter K1.

UE 115 may generate and send a feedback message 380 to base station. Feedback message 380 may include feedback information 382 generated based on feedback configuration 307, threshold 306, and PDSCH feedback report 314. Examples of feedback information 382 are described further herein at least with reference to FIGS. 4-7.

In some implementations, priority information 309 may indicate that a dynamic grant has a highest priority, a first SPS configuration "SPS config 0" has a second highest priority, a second SPS configuration "SPS config 1" has a third highest priority, and a third SPS configuration "SPS config 2" has a fourth highest priority. Each of the dynamic grant, the first SPS configuration, the second SPS configuration, and the third SPS configuration may be associated with the same size PDSCH feedback report. Additionally, the feedback configuration 307 may indicate that threshold 306 is associated with both DG and SPS grants, threshold 306 is equal to four times a size of PDSCH feedback report 314, and a format of the feedback information includes entire PDSCH feedback reports. UE 115 may receive a PDSCH DG, a PDSCH SPS config 0 OCC 0, a PDSCH SPS config 0 OCC 3, a PDSCH SPS config 1 OCC 1, a PDSCH SPS config 2 OCC 0, a PDSCH SPS config 2 OCC 1, a PDSCH SPS config 2 OCC 2, a PDSCH SPS config 2 OCC 3.

Based on the feedback configuration 307, threshold 306, and priority information 309, UE 115 may generate feedback information 382 to include a full PDSCH feedback report for the PDSCH DG, the PDSCH SPS config 0 OCC0, the PDSCH SPS config 0 OCC 3, and the PDSCH SPS config 1 OCC0. Based on the threshold 306, 0 bits remain. UE 115 may drop PDSCH feedback information (e.g., PDSCH feedback report) for the remaining PDSCHs or defer the PDSCH feedback information (for the remaining PDSCHs) to a next available uplink grant, such as PUCCH.

In some implementations, priority information 309 may indicate that a dynamic grant has a highest priority, a first SPS configuration "SPS config 0" has a second highest priority, a second SPS configuration "SPS config 1" has a third highest priority, and a third SPS configuration "SPS config 2" has a fourth highest priority. Each of the dynamic grant, the first SPS configuration, the second SPS configuration, and the third SPS configuration may be associated with the same size PDSCH feedback report. Additionally, the feedback configuration 307 may indicate that threshold 306 is associated with both DG and SPS grants, threshold 306 is equal to four times a size of PDSCH feedback report 314 and an additional number of r bits, where r is a positive integer and is less than a size of the PDSCH feedback report 314 or is less than a size of a CSI portion of the PDSCH feedback report 314. UE 115 may receive a PDSCH DG, a PDSCH SPS config 0 OCC 0, a PDSCH SPS config 0 OCC 3, a PDSCH SPS config 1 OCC 1, a PDSCH SPS config 2 OCC 0, a PDSCH SPS config 2 OCC 1, a PDSCH SPS config 2 OCC 2, a PDSCH SPS config 2 OCC 3.

Based on feedback configuration 307, threshold 306, and priority information 309, UE 115 may generate feedback information 382 to include a full PDSCH feedback report for the PDSCH DG, the PDSCH SPS config 0 OCC 0, the PDSCH SPS config 0 OCC 3, and the PDSCH SPS config 1 OCC0. Based on the threshold 306, r bits remain. In some implementations, based on feedback configuration 307, UE 115 may not use the r bits that remain and may drop PDSCH feedback information (e.g., PDSCH feedback report) for the remaining PDSCHs or defer the PDSCH feedback information (for the remaining PDSCHs) to a next available uplink grant, such as PUCCH. Alternatively, based on feedback configuration 307, UE 115 may use the r bits to report the PDSCH SPS config 2 OCC 0. For example, UE 115 may include a portion of the PDSCH feedback report for the PDSCH SPS config 2 OCC 0 in the remaining bits or may encode, based on encoding information 308 (e.g., one or more tables), at least a portion of the PDSCH feedback report for the PDSCH SPS config 2 OCC 0. To illustrate, if a number of remaining bits=1, an ACK/NACK portion of the PDSCH feedback report for the PDSCH SPS config 2 OCC 0 may be included in feedback information 382. As another example, if a number of remaining bits>1, a first bit of the remaining bits may indicate an ACK/NACK portion of the PDSCH feedback report for the PDSCH SPS config 2 OCC 0 and the other remaining bits may be used to encode CSI of the the PDSCH feedback report for the PDSCH SPS config 2 OCC 0.

In some implementations, priority information 309 may indicate that a dynamic grant has a highest priority, a first SPS configuration "SPS config 0" has a second highest priority, a second SPS configuration "SPS config 1" has a third highest priority, and a third SPS configuration "SPS config 2" has a fourth highest priority. Each of the dynamic grant, the first SPS configuration, the second SPS configuration, and the third SPS configuration may be associated with the same size PDSCH feedback report. The PDCH feedback report may include K+1 bits, where K is a positive integer and corresponds to a size of CSI of the PDSCH feedback report. Additionally, feedback configuration 307 may indicate that threshold 306 is associated with both DG and SPS grants, threshold 306 is equal to 3(K+1)+1 bits, and a format may include ACK/NACK feedback before CSI feedback. UE 115 may receive a PDSCH DG, a PDSCH SPS config 0 OCC 0, a PDSCH SPS config 0 OCC 3, a PDSCH SPS config 1 OCC 1, a PDSCH SPS config 2 OCC 0, a PDSCH SPS config 2 OCC 1, a PDSCH SPS config 2 OCC 2, a PDSCH SPS config 2 OCC 3.

Based on feedback configuration 307, threshold 306, and priority information 309, UE 115 may generate feedback information 382 may determine to provide ACK/NACK feedback for any may grants as possible or for a number of grants, such as a number of grants selected by UE 115 or that is indicated by feedback configuration 307. To illustrate, UE 115 may decide to provide ACK/NACK feedback for PDSCH DG, the PDSCH SPS config 0 OCC0, the PDSCH SPS config 0 OCC 3, the PDSCH SPS config 1 OCC 0, and the PDSCH SPS config 2 OCC 0. Each ACK/NACK may include 1 bit and, accordingly, a total of 5 bits are used to provide the ACK/NACK feedback and 3K−1 bits remain. Since 3K−1 bits remain, feedback information 382 further includes CSI (K bits) for the PDSCH DG and CSI (K bits) for the PDSCH SPS config 0 OCC0. For the remaining K−1 bits, UE 115 may drop the bits or may use the bits for a portion of CSI for the PDSCH SPS config 0 OCC 3 or may encode CSI the PDSCH SPS config 0 OCC 3. Additionally, UE 115 may drop all remaining PDSCH feedback reports where UE 115 sent part of the report. UE 115 may drop PDSCH feedback information (e.g., PDSCH feedback report) for the remaining PDSCHs or defer the PDSCH feedback information (for the remaining PDSCHs) to a next available uplink grant, such as PUCCH.

In some implementations, threshold 306 corresponds to one or more SPS grants and not DG grants. In some implementations, when UE 115 has a PDSCH feedback report for a PDSCH DG, UE 115 may include a dynamic feedback information portion in feedback message 380 prior to feedback information 382. The dynamic feedback information portion may include one or more full PDSCH feedback reports. Feedback information 382 may be generated for the one or more grant types based on threshold 306, feedback configuration 307, encoding information 308, priority information 309, or a combination thereof, as described herein.

In some implementations, UE 115 may arrange full PDSCH feedback reports based on priority information 309. UE 115 may then encode a portion or an entirety of the arranged full PDSCH feedback reports based on threshold 306 and feedback configuration 307. For example, if feedback configuration 307 indicates that threshold 306 corresponds to DG grants and SPS grants, UE 115 may encode, based on encoding information 308, the entirety of the arranged full PDSCH feedback reports to have a number of bits that is less than or equal to threshold 306 and the encoded bits correspond to feedback information 382. As another example, if feedback configuration 307 indicates that threshold 306 corresponds to SPS grants only, UE 115 may encode, based on encoding information 308, a portion of the arranged full PDSCH feedback reports corresponding to PDSCH feedback reports for SPS PDSCHs such that the portion is encoded to have a number of bits that is less than or equal to threshold 306 and the encoded bits correspond to feedback information 382.

In some implementations, a method of wireless communication performed by UE 115 includes transmitting feedback message 380 including feedback information 382 for one or more received PDSCHs (e.g., 374) associated with one or more PDSCH grant types, a number of bits of the feedback information 382 included in the feedback message 380 for the one or more received PDSCHs associated with the one or more PDSCH grant types is less than or equal to a threshold 306 associated with a number of bits for feedback of the one or more PDSCH grant types. The method may also include determining the threshold 306.

In some implementations, a method of wireless communication performed by base station 105 includes receiving a feedback message 380 including feedback information 382 for one or more PDSCHs (e.g., 374) associated with one or more PDSCH grant types, a number of bits of the feedback information 382 included in the feedback message 380 for the one or more PDSCHs (e.g., 374) associated with the one or more PDSCH grant types is less than or equal to a threshold 364 associated with a number of bits for feedback of the one or more PDSCH grant types. The method may also include determining the threshold 364. Additionally, or alternatively, the one or more PDSCHs may be transmitted by base station 105, received by UE 115, or a combination thereof.

As described with reference to FIG. 3, the present disclosure provides techniques for feedback for mixed grant types. In some aspects, the present disclosure provides feedback for mixed grant types, such as an SPS grant type, a dynamic PDSCH grant type, or a combination thereof. For example, the present disclosure may reduce hybrid automatic repeat request (HARQ)-acknowledgement (ACK) feedback for mixed grant types. To illustrate, feedback configuration 307 may be used by UE 115 to generate feedback message 380. By generating feedback message 380 that includes based on feedback configuration 307, UE 115 may limit or control a size of feedback message 380 and UE 115 may provide timely feedback for one or more PDSCHs to base station 105, which enables base station 105 to react to the feedback and changing channel conditions. In some aspects, UE 115 may also store one or more feedback reports for received PDSCHs according to priority information 309 and generate feedback message 380 based on the one or more stored feedback reports. By utilizing priority information 309, UE 115 may generate feedback message 380 that includes feedback for high priority PDSCHs before low priority PDSCHs and can defer or drop feedback reports of one or more low priority PDSCHs that were not included in feedback message 380. Additionally, feedback configuration 307 indicated by base station 105 provides flexibility to the format of feedback information 382, which may reduce an overhead cost of PDSCH feedback and improve system efficiency.

Figure 4:
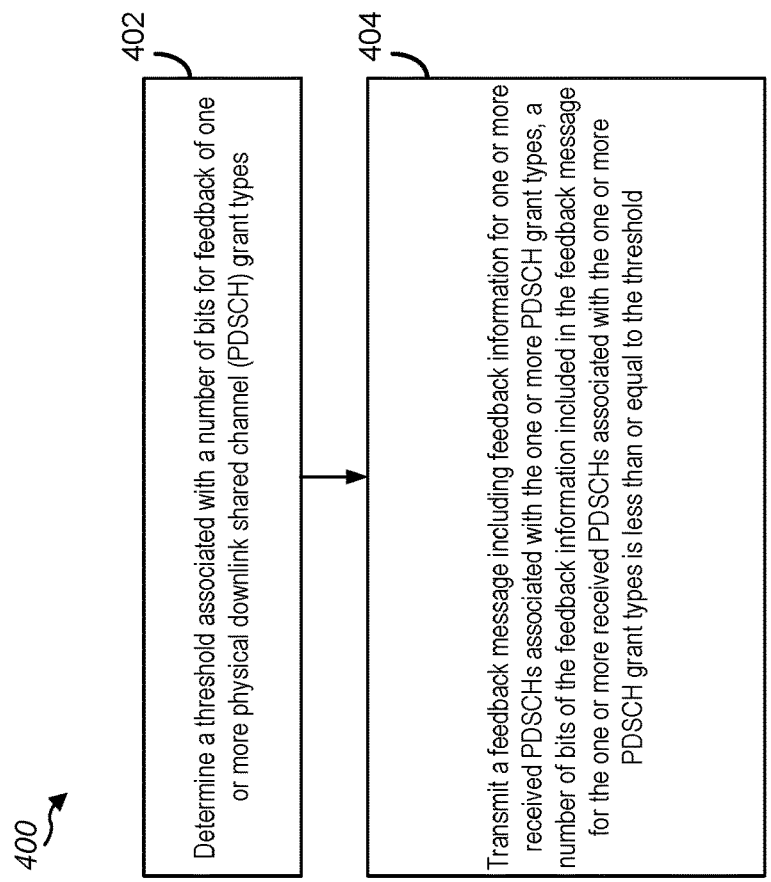
FIG. 4 is a flow diagram illustrating an example process that supports feedback for mixed grant types according to one or more aspects.

FIG. 4 is a flow diagram illustrating an example process 400 that supports feedback for mixed grant types according to some aspects. Operations of process 400 may be performed by a UE, such as UE 115 described above with reference to FIGS. 1-3, or a UE 500 described with reference to FIG. 5. For example, example operations (also referred to as "blocks") of process 400 may enable UE 115 or the UE 500 of FIG. 5 to support feedback for mixed grant types.

In block 402, the UE determines a threshold associated with a number of bits for feedback of one or more PDSCH grant types. The threshold may include or correspond to threshold 306 or 364. In some implementations, the threshold indicates a maximum number of bits allocated for feedback information for one or more received PDSCHs associated with the one or more PDSCH grant types. The feedback information may include or correspond to feedback information 382.

In some implementations, the one or more PDSCH grant types include a SPS grant type, such as a first SPS grant type having first configuration, a second SPS grant type having a second configuration, or a combination thereof. Additionally, or alternatively, the one or more PDSCH grant types may include multiple PDSCH grant types, such as a dynamic PDSCH grant type. The UE may determine or identify the one or more PDSCH grant types. In some implementations, the one or more PDSCH grant types include multiple PDSCH grant types, and multiple PDSCHs are associated with the multiple PDSCH grant types.

In block 404, the UE transmits a feedback message including feedback information for one or more received PDSCHs associated with the one or more PDSCH grant types. The feedback message and the feedback information may include or correspond to feedback message 380 and feedback information 382, respectively. In some implementations, the feedback message includes a PUCCH. The one or more received PDSCHs may include or correspond to PDSCH 374. In some implementations, the one or more received PDSCHs include multiple PDSCHs. A number of bits of the feedback information included in the feedback message for the one or more received PDSCHs associated with the one or more PDSCH grant types is less than or equal to the threshold. In some implementations, the feedback information includes one or more ACK/NACK bits, CSI, or a combination thereof. The CSI may include a CQI, channel rank information, power information, a BLER, a BER, or a combination thereof. Additionally, or alternatively, the feedback information may include HARQ-ACK feedback information.

In some implementations, the UE receives a feedback configuration associated with the one or more PDSCH grant types. The feedback configuration may include or correspond to feedback configuration 307. The feedback configuration may be included in an RRC message, an MAC-CE, or DCI. Additionally, or alternatively, the threshold may be determined based on the feedback configuration.

In some implementations, the UE receives one or more indicators. The UE may receive the one or more indicators from a base station, such as base station 105. The one or more indicators may include or correspond to the feedback configuration. The one or more indicators may include a first indicator, a second indicator, a third indicator, a fourth indicator, a fifth indicator, a six indicator, or a combination thereof. The first indicator may indicate the threshold. The second indicator may indicate whether the one or more PDSCH grant types includes a SPS grant type or a SPS grant type and a dynamic grant type. The third indicator may indicate a format of the feedback information. For example, the format may indicate that the feedback information, or a portion thereof, is to be encoded using an encoding scheme. The fourth indicator may indicate an encoding scheme, such as the encoding scheme associated with the third indicator. The fifth indicator may indicate whether to, based on transmission of the feedback message, discard or maintain a stored feedback report of a received PDSCH when the feedback message is generated independent of the stored feedback report. The sixth indicator may indicate whether to discard one or more remaining available bits of the feedback information or to use the one or more remaining available bits to indicate at least a portion of a feedback report of a received PDSCH associated with the one or more PDSCH grant types.

In some implementations, the one or more indicators may be included in a control message, such as control message 370. For example, the one or more indicators may be included in an RRC message or an MAC-CE. Additionally, or alternatively, the first indicator or an update thereof, the second indicator or an update thereof, the third indicator or an update thereof, the fifth indicator or an update thereof, the sixth indicator or an update thereof, or a combination thereof, may be included in DCI.

In some implementations, when the one or more received PDSCHs associated with the one or more PDSCH grant types includes multiple received PDSCHs each having a feedback report, the format may indicate to arrange the feedback information as a series of feedback reports of the feedback reports of the multiple received PDSCHs. Alternatively, when the one or more received PDSCHs associated with the one or more PDSCH grant types includes multiple received PDSCHs each having a feedback report, the format may indicate to arrange the feedback information as at least a first consecutive portion including ACK/NACK bits of the feedback reports of the multiple received PDSCHs. Additionally, or alternatively, the format may indicate to arrange the feedback information as a second consecutive portion of CSI of at least one feedback report of the feedback reports of the multiple received PDSCHs.

In some implementations, the UE generates the feedback information based on the one or more indicators. For example, the UE my generate the feedback information based on the first indicator, the second indicator, the third indicator, the fourth indicator, the fifth indicator, the six indicator, or a combination thereof. To illustrate, the UE may generate the feedback information based on the threshold.

In some implementations, the UE receives priority information associated with the one or more PDSCH grant types. For example, the priority information may be received from a base station, such base station 105. The priority information may be included in an RRC message, an MAC-CE, or DCI. As an illustrative, non-limiting example, a dynamic PDSCH grant type may have a highest priority, a first SPS grant type including a first configuration may have a second highest priority, and a second SPS grant type including a second configuration may have a third highest priority.

In some implementations, for each PDSCH received by the UE, the UE generates a feedback report for the PDSCH. For example, the feedback report may include or correspond to PDSCH feedback report 314. Each feedback report may include an ACK/NACK status, channel state information, or a combination thereof. Additionally, or alternatively, for each received PDSCH, the UE may store the feedback report. For example, the UE may store the feedback report in a buffer, such as buffer 313. In some implementations, for each received PDSCH, the feedback report for the PDSCH may be stored based on a PDSCH grant type associated with the PDSCH, priority information associated with multiple PDSCH grant types, a reception time of the PDSCH, or a combination thereof.

In some implementations, the UE determines an arrangement (or format) of the feedback information. The feedback information for the one or more received PDSCHs associated with the one or more PDSCH grant types may be generated based on a set of feedback reports for the one or more received PDSCHs associated with the one or more PDSCH grant types. For example, the UE may arrange multiple feedback reports based on the priority information.

In some implementations, the UE selects a first feedback report for the one or more received PDSCHs associated with the one or more PDSCH grant types and generates the feedback information to include the first feedback report. The UE also may determine whether a number of bits of the feedback information including the first feedback report is less than or equal to the threshold. In some implementations, the UE transmits the feedback message based on a determination that the number of bits of the feedback information is less than or equal to the threshold.

In some other implementations, based on a determination that the number of bits of the feedback information is less than the threshold, the UE may determine a difference between the number of bits of the feedback information and the threshold. Based on a determination that the difference is greater than or equal to a size of a second feedback report of a received PDSCH associated with the one or more PDSCH grant types, the UE may include the second feedback report in the feedback information. Alternatively, based on a determination that the difference is less than a size of a second feedback report of a received PDSCH associated with the one or more PDSCH grant types, and if the difference is equal to one, the UE may include ACK/NACK bit of a second feedback report in the feedback information. However, based on a determination that the difference is less than a size of a second feedback report of a received PDSCH associated with the one or more PDSCH grant types, and if the difference is greater than one, the UE may include an ACK/NACK bit of a second feedback report in the feedback information and determine whether to include one or more bits based on the CSI of the second feedback report in the feedback information.

In some implementations, the UE determines a number of stored feedback reports associated with the one or more PDSCH grant types. If the number of stored feedback reports associated with the one or more PDSCH grant types is greater than a maximum number of bits allocated for the feedback information for the one or more PDSCHs associated with the one or more PDSCH grant types, the UE may select a number of feedback reports equal to the maximum number of bits allocated for the feedback information for the one or more PDSCHs associated with the one or more PDSCH grant types and, for each selected feedback report, include an ACK/NACK bit of the feedback report in the feedback information. Additionally, the UE may discard or maintain one or more feedback reports associated with the one or more PDSCH grant types other than one of selected feedback reports. Alternatively, if the number of stored feedback reports associated with the one or more PDSCH grant types is less than or equal to a maximum number of bits allocated for the feedback information for the one or more PDSCHs associated with the one or more PDSCH grant types, the UE may include an ACK/NACK bit of the feedback report in the feedback information for each stored feedback report associated with the one or more PDSCH grant types. The UE also may determine a difference between the number of bits of the feedback information and the threshold. For a first ACK/NACK bit of a first feedback report included in the feedback information, the UE may compare a size of the CSI of the first feedback report and the difference. If the size of the CSI of the first feedback report is less than or equal to the difference, the UE may include the CSI in the feedback information. Alternatively, if the size of the CSI of the first feedback report is greater than the difference, the UE may initiate transmission of the feedback message. In another implementation, if the size of the CSI of the first feedback report is greater than the difference, the UE may determine whether to include one or more bits based on the CSI of the first feedback report in the feedback information. Additionally, or alternatively, if the size of the CSI of the first feedback report is greater than the difference, for each stored feedback report associated with the one or more PDSCH grant types for which the CSI of the stored feedback report was not included in the feedback information, the UE may discard the CSI.

In some implementations, when the threshold is associated with the one or more PDSCH grant types and the one or more PDSCH grant types do not include a dynamic grant type—i.e, the threshold is not associated with one or more dynamic grants, the feedback message may include dynamic grant feedback information for one or more received PDSCHs associated with the dynamic grant type. The dynamic grant feedback information may be distinct from the feedback information. Accordingly, the feedback message may include a first portion for the dynamic grant feedback information and a second portion for the feedback information generated based on the threshold.

In some implementations, the UE arranges a set of feedback reports for the one or more received PDSCHs associated with the one or more PDSCH grant types. For example, the set of feedback reports may be arranged based on priority information or based on a receive order associated with the feedback reports. The UE may encode the arranged set of feedback reports based on the threshold to generate the feedback information having a number of bits that is less than or equal to the threshold. In implementations in which the threshold is not associated with a dynamic PDSCH grant type, the UE may arrange a feedback report for a received PDSCH associated with the dynamic PDSCH grant type prior to the set of feedback reports.

As described with reference to FIG. 4, the present disclosure provides techniques for providing feedback for mixed grant types. In some aspects, the present disclosure provides feedback for mixed grant types, such as an SPS grant type, a dynamic PDSCH grant type, or a combination thereof. For example, the present disclosure may reduce hybrid automatic repeat request (HARQ)-acknowledgement (ACK) feedback for mixed grant types.

Figure 5:
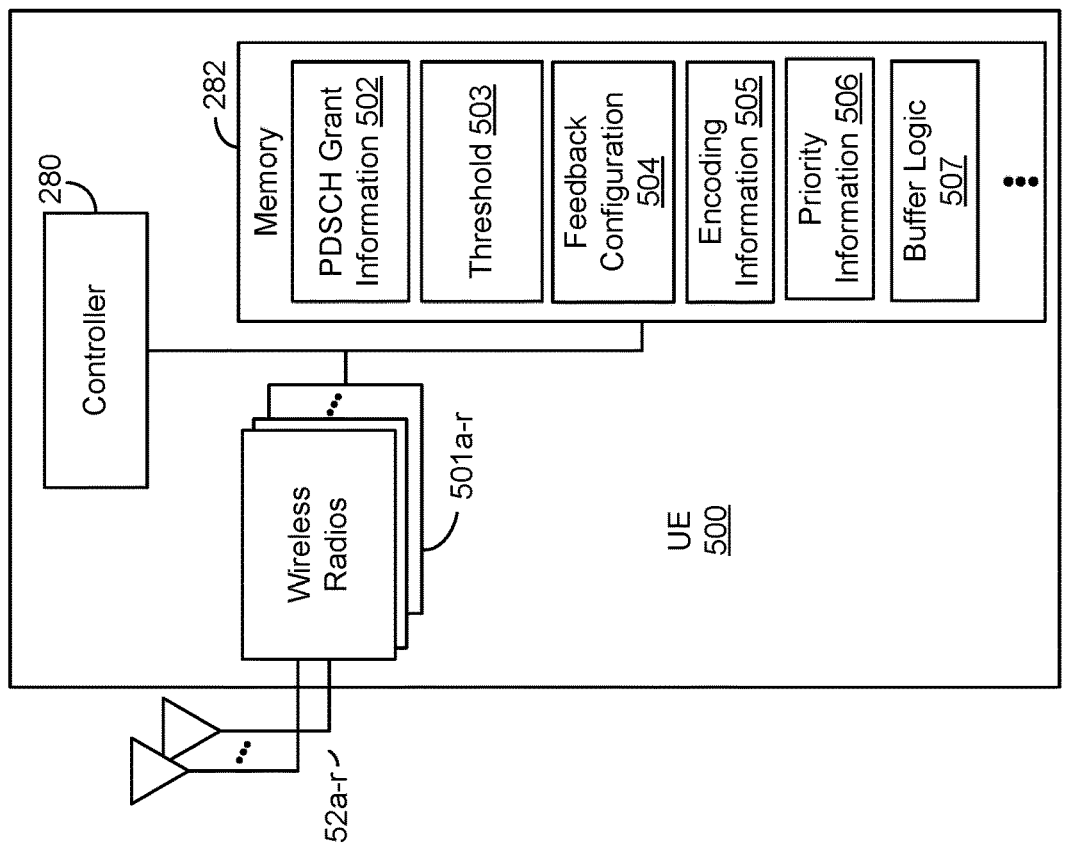
FIG. 5 is a block diagram of an example UE that supports feedback for mixed grant types according to one or more aspects.

FIG. 5 is a block diagram of an example UE 500 that supports feedback for mixed grant types according to some aspects. UE 500 may be configured to perform operations, including operations described above with reference to FIG. 3 or the blocks of process 400 described with reference to FIG. 4, to provide feedback for mixed grant types. In some implementations, UE 500 includes the structure, hardware, and components shown and described with reference to UE 115 of FIG. 2 or 4. For example, UE 500 includes controller 280, which operates to execute logic or computer instructions stored in memory 282, as well as controlling the components of UE 500 that provide the features and functionality of UE 500. UE 500, under control of controller 280, transmits and receives signals via wireless radios 501$a$-$r$ and antennas 252$a$-$r$. Wireless radios 501$a$-$r$ include various components and hardware, as illustrated in FIG. 2 for UE 115, including modulator and demodulators 254$a$-$r$, MIMO detector 256, receive processor 258, transmit processor 264, and TX MIMO processor 266.

As shown, memory 282 may include PDSCH grant information 502, one or more thresholds 503, a feedback configuration 504, encoding information 505, priority information 506, and buffer logic 507. PDSCH grant information 502, one or more thresholds 503, a feedback configuration 504, encoding information 505, and priority information 506 may include or correspond to PDSCH grant information 305, threshold 306 or 364, feedback configuration 307, encoding information 308, and priority information 309, respectively. Buffer logic 507 may include or correspond to buffer 313. UE 500 may receive signals from or transmit signals to one or more network entities, such as station 105 of FIGS. 1-3 or a base station as illustrated in FIG. 7.

FIG. 6 is a flow diagram illustrating an example process 600 that supports feedback for mixed grant types according to some aspects. Operations of process 600 may be performed by a base station, such as base station 105 described above with reference to FIGS. 1-3 or a base station as described with reference to FIG. 7. For example, example operations of process 600 may enable base station 105 or the base station of FIG. 7 to support feedback for mixed grant types.

In block 602, the base station determines a threshold associated with a number of bits for feedback of one or more PDSCH grant types. The threshold may include or correspond to threshold 306 or 364. In some implementations, the threshold indicates a maximum number of bits allocated for feedback information for one or more PDSCHs associated with the one or more PDSCH grant types. The feedback information may include or correspond to feedback information 382.

In some implementations, the one or more PDSCH grant types include a SPS grant type, such as a first SPS grant type having first configuration, a second SPS grant type having a second configuration, or a combination thereof. Additionally, or alternatively, the one or more PDSCH grant types may include multiple PDSCH grant types, such as a dynamic PDSCH grant type.

In some implementations, the base station may transmit one or more PDSCHs, such as multiple PDSCHs, to a UE. Additionally, or alternatively, the base station may store tracking information of the transmitted one or more PDSCHs. The tracking information may include or correspond to the PDSCH information 366. The tracking information may be generated or stored according to priority information for multiple PDSCH grant types.

In block 604, the base station receives a feedback message including feedback information for one or more PDSCHs associated with the one or more PDSCH grant types. The feedback message and the feedback information may include or correspond to feedback message 380 and feedback information 382, respectively. In some implementations, the feedback message may include a PUCCH. A number of bits of the feedback information included in the feedback message for the one or more PDSCHs associated with the one or more PDSCH grant types is less than or equal to the threshold. The feedback information may include one or more ACK/NACK bits, CSI, encoded data, or a combination thereof. The CSI may include a CQI, channel rank information, power information, a BLER, a BER, or a combination thereof. Additionally, or alternatively, the feedback information may include HARQ-ACK feedback information.

In some implementations, the one or more PDSCHs include multiple PDSCHs. The one or more PDSCHs may include or correspond to PDSCH 374. Additionally, or alternatively, the one or more PDSCH grant types include multiple PDSCH grant types, and the multiple PDSCHs are associated with the multiple PDSCH grant types.

In some implementations, the base station transmits a feedback configuration associated with the one or more PDSCH grant types. The feedback configuration may include or correspond to feedback configuration 307. The feedback configuration may be included in an RRC message, a MAC-CE, or DCI. Additionally, or alternatively, the feedback configuration includes or indicates the threshold, is associated with the one or more PDSCH grant types, or a combination thereof.

In some implementations, the base station determines or transmits one or more indicators. The base station may transmit the one or more indicators to a UE, such as UE 115. The one or more indicators may include or correspond to the feedback configuration. The one or more indicators may include a first indicator, a second indicator, a third indicator, a fourth indicator, a fifth indicator, a six indicator, or a combination thereof. The first indicator may indicate the threshold. The second indicator may indicate whether the one or more PDSCH grant types includes a SPS grant type or a SPS grant type and a dynamic grant type. The third indicator may indicate a format of the feedback information. For example, the format may indicate that the feedback information, or a portion thereof, is to be encoded using an encoding scheme. The fourth indicator may indicate an encoding scheme, such as the encoding scheme associated with the third indicator. The fifth indicator may indicate whether to, based on transmission of the feedback message, discard or maintain a stored feedback report of a received PDSCH when the feedback message is generated independent of the stored feedback report. The sixth indicator may indicate whether to discard one or more remaining available bits of the feedback information or to use the one or more remaining available bits to indicate at least a portion of a feedback report of a received PDSCH associated with the one or more PDSCH grant types. The UE may generate the feedback information based on the first indicator, the second indicator, the third indicator, the fourth indicator, the fifth indicator, the sixth indicator, or a combination thereof.

In some implementations, when the one or more PDSCHs associated with the one or more PDSCH grant types includes multiple PDSCHs each having a feedback report, the format may indicate to arrange the feedback information as a series of feedback reports of the feedback reports of the multiple received PDSCHs. Alternatively, when the one or more PDSCHs associated with the one or more PDSCH grant types includes multiple PDSCHs each having a feedback report, the format may indicate to arrange the feedback information as at least a first consecutive portion including ACK/NACK bits of the feedback reports of the multiple PDSCHs. Additionally, or alternatively, the format may indicate to arrange the feedback information as a second consecutive portion of CSI of at least one feedback report of the feedback reports of the multiple PDSCHs.

In some implementations, the one or more indicators may be included in a control message, such as control message 370. For example, the one or more indicators may be included in an RRC message or an MAC-CE. Additionally, or alternatively, the first indicator or an update thereof, the second indicator or an update thereof, the third indicator or an update thereof, the fifth indicator or an update thereof, the sixth indicator or an update thereof, or a combination thereof, may be included in DCI.

In some implementations, the base station transmits priority information associated with the one or more PDSCH grant types. For example, the priority information may be transmitted to a UE, such as UE 115. The priority information may be included in an RRC message, an MAC-CE, or DCI. As an illustrative, non-limiting example, a dynamic PDSCH grant type may have a highest priority, a first SPS grant type including a first configuration may have a second highest priority, and a second SPS grant type including a second configuration may have a third highest priority.

In some implementations, the feedback information for the one or more PDSCHs associated with the one or more PDSCH grant types is generated based on a set of feedback reports for the one or more PDSCHs associated with the one or more PDSCH grant types. When the one or more PDSCH grant types do not include a dynamic grant type, the feedback message may include dynamic grant feedback information for one or more PDSCHs associated with the dynamic grant type. The dynamic grant feedback information may be distinct from the feedback information.

In some implementations, the base station parses the feedback information. For example, based on the parsed feedback information, the base station may determine, for each of the one or more PDSCHs associated with the one or more PDSCH grant types, an ACK/NACK status, channel state information, or a combination thereof. Additionally, or alternatively, the base station may decode at least a portion of the feedback information based on an encoding scheme. In some implementations, the base station decodes and parses the feedback information.

As described with reference to FIG. 6, the present disclosure provides techniques for providing feedback for mixed grant types. In some aspects, the present disclosure provides feedback for mixed grant types, such as an SPS grant type, a dynamic PDSCH grant type, or a combination thereof. For example, the present disclosure may reduce HARQ-ACK feedback for mixed grant types.

FIG. 7 is a block diagram of an example base station 700 that supports feedback for mixed grant types according to some aspects. Base station 700 may be configured to perform operations, including the blocks of the process 600 described with reference to FIG. 6, to support feedback for mixed grant types. In some implementations, base station 700 includes the structure, hardware, and components shown and described with reference to base station 105 of FIGS. 1-3. For example, base station 700 may include controller 240, which operates to execute logic or computer instructions stored in memory 242, as well as controlling the components of base station 700 that provide the features and functionality of base station 700. Base station 700, under control of controller 240, transmits and receives signals via wireless radios 701*a-t* and antennas 234*a-t*. Wireless radios 701*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, memory 242 may include PDSCH grant information 702, configuration information 703, PDSCH information 704, and encoding information 705. PDSCH grant information 702, configuration information 703, PDSCH information 704, and encoding information 705 may include or correspond to PDSCH grant types information 360 or PDSCH grant information 305, configuration information 362, PDSCH information 366, and encoding information 308, respectively. In some implementations, configuration information 703 may include feedback configuration 307, threshold 306, threshold 364, or a combination thereof. Base station 700 may receive signals from or transmit signals to one or more UEs, such as UE 115 of FIGS. 1-3 or UE 500 of FIG. 5.

It is noted that one or more blocks (or operations) described with reference to FIGS. 4 and 6 may be combined with one or more blocks (or operations) described with reference to another of the figures. For example, one or more blocks (or operations) of FIG. 4 may be combined with one or more blocks (or operations) of FIG. 6. As another example, one or more blocks associated with FIG. 4 or 6 may be combined with one or more blocks (or operations) associated with FIGS. 1-3. Additionally, or alternatively, one or more operations described above with reference to FIGS. 1-3 may be combined with one or more operations described with reference to FIG. 5 or 7.

In some aspects, techniques for supporting feedback for mixed grant types may include additional aspects, such as any single aspect or any combination of aspects described below or in connection with one or more other processes or devices described elsewhere herein. In a first aspect, techniques for supporting feedback for mixed grant types may include determining a threshold associated with a number of bits for feedback of one or more PDSCH grant types. The techniques further include transmitting a feedback message including feedback information for one or more received PDSCHs associated with the one or more PDSCH grant types. A number of bits of the feedback information included in the feedback message for the one or more received PDSCHs associated with the one or more PDSCH grant types is less than or equal to the threshold. In some examples, the techniques in the first aspect may be implemented in a method or process. In some other examples, the techniques of the first aspect may be implemented in a wireless communication device such as a receive device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a second aspect, in combination with the first aspect, the threshold indicates a maximum number of bits allocated for the feedback information for the one or more received PDSCHs associated with the one or more PDSCH grant types.

In a third aspect, in combination with the first aspect or the second aspect, the one or more PDSCH grant types include a SPS grant type.

In a fourth aspect, in combination with the third aspect, the one or more PDSCH grant types include multiple PDSCH grant types.

In a fifth aspect, in combination with the fourth aspect, the multiple PDSCH grant types include a dynamic PDSCH grant type.

In a sixth aspect, in combination with one or more of the first aspect through the fifth aspect, the techniques further include receiving a feedback configuration associated with the one or more PDSCH grant types.

In a seventh aspect, in combination with the sixth aspect, the threshold is determined based on the feedback configuration.

In an eighth aspect, in combination with one or more of the first aspect through the seventh aspect, the techniques further include determining the one or more PDSCH grant types.

In a ninth aspect, in combination with the eighth aspect, the techniques further include determining an arrangement of the feedback information.

In a tenth aspect, in combination with one or more of the first aspect through the ninth aspect, the feedback message includes a PUCCH.

In an eleventh aspect, in combination with one or more of the first aspect through the tenth aspect, the one or more received PDSCHs include multiple PDSCHs.

In a twelfth aspect, in combination with the eleventh aspect, the one or more PDSCH grant types include multiple PDSCH grant types.

In a thirteenth aspect, in combination with the twelfth aspect, the multiple PDSCHs are associated with the multiple PDSCH grant types.

In a fourteenth aspect, in combination with the twelfth aspect or the thirteenth aspect, the multiple PDSCH grant types include a dynamic PDSCH grant type, a first SPS grant type having first configuration, a second SPS grant type having a second configuration, or a combination thereof.

In a fifteenth aspect, in combination with one or more of the first aspect through the fourteenth aspect, the feedback information includes one or more ACK/NACK bits, CSI, or a combination thereof.

In a sixteenth aspect, in combination with the fifteenth aspect, the channel state information includes a CQI, channel rank information, power information, a BLER, a BER, or a combination thereof.

In a seventeenth aspect, in combination with the fifteenth aspect, the feedback information includes HARQ-ACK feedback information.

In an eighteenth aspect, in combination with one or more of the first aspect through the seventeenth aspect, the techniques further include, for each received PDSCH, generating a feedback report for the PDSCH.

In a nineteenth aspect, in combination with the eighteenth aspect, the techniques further include, for each received PDSCH, storing the feedback report.

In a twentieth aspect, in combination with the eighteenth aspect, each feedback report includes an ACK/NACK status, channel state information, or a combination thereof.

In a twenty-first aspect, in combination with one or more of the eighteenth aspect through the twentieth aspect, for each received PDSCH, the feedback report for the PDSCH is stored based on a PDSCH grant type associated with the PDSCH, priority information associated with multiple PDSCH grant types, a reception time of the PDSCH, or a combination thereof.

In a twenty-second aspect, in combination with one or more of the first aspect through the twenty-first aspect, the techniques further include receiving priority information associated with the one or more PDSCH grant types.

In a twenty-third aspect, in combination with the twenty-second aspect, a dynamic PDSCH grant type has a highest priority, a first SPS grant type including a first configuration has a second highest priority, a second SPS grant type including a second configuration has a third highest priority, or a combination thereof.

In a twenty-fourth aspect, in combination with the twenty-second aspect, the techniques further include arranging multiple feedback reports based on the priority information.

In a twenty-fifth aspect, in combination with one or more of the first aspect through the twenty-fourth aspect, the feedback information for the one or more received PDSCHs associated with the one or more PDSCH grant types is generated based on a set of feedback reports for the one or more received PDSCHs associated with the one or more PDSCH grant types.

In a twenty-sixth aspect, in combination with one or more of the first aspect through the twenty-fifth aspect, the techniques further include generating the feedback information based on the threshold.

In a twenty-seventh aspect, in combination with one or more of the first aspect through the twenty-sixth aspect, the techniques further include selecting a first feedback report for the one or more received PDSCHs associated with the one or more PDSCH grant types.

In a twenty-eighth aspect, in combination with the twenty-seventh aspect, the techniques further include generating the feedback information to include the first feedback report.

In a twenty-ninth aspect, in combination with the twenty-eighth aspect, the techniques further include determining whether a number of bits of the feedback information including the first feedback report is less than or equal to the threshold.

In a thirtieth aspect, in combination with one or more of the twenty-seventh aspect through the twenty-ninth aspect, the feedback message is transmitted based on a determination that the number of bits of the feedback information is less than or equal to the threshold.

In a thirty-first aspect, in combination with one or more of the twenty-seventh aspect through the twenty-ninth aspect, the techniques further include, based on a determination that the number of bits of the feedback information is less than the threshold, determining a difference between the number of bits of the feedback information and the threshold.

In a thirty-second aspect, in combination with the thirty-first aspect, the techniques further include, based on a determination that the difference is greater than or equal to a size of a second feedback report of a received PDSCH associated with the one or more PDSCH grant types, including the second feedback report in the feedback information.

In a thirty-third aspect, in combination with the thirty-first aspect, the techniques further include, based on a determination that the difference is less than a size of a second feedback report of a received PDSCH associated with the one or more PDSCH grant types, and if the difference is equal to one, including ACK/NACK bit of a second feedback report in the feedback information.

In a thirty-fourth aspect, in combination with the thirty-first aspect, the techniques further include, based on a determination that the difference is less than a size of a second feedback report of a received PDSCH associated with the one or more PDSCH grant types, and if the difference is greater than one, including an ACK/NACK bit of a second feedback report in the feedback information.

In a thirty-fifth aspect, in combination with one or more of the thirty-first aspect or the thirty-fourth aspect, the techniques further include, based on a determination that the difference is less than a size of a second feedback report of a received PDSCH associated with the one or more PDSCH grant types, and if the difference is greater than one, determining whether to include one or more bits based on the CSI of the second feedback report in the feedback information.

In a thirty-sixth aspect, in combination with one or more of the first aspect through the twenty-sixth aspect, the techniques further include determining a number of stored feedback reports associated with the one or more PDSCH grant types.

In a thirty-seventh aspect, in combination with the thirty-sixth aspect, the techniques further include, if the number of stored feedback reports associated with the one or more PDSCH grant types is greater than a maximum number of bits allocated for the feedback information for the one or more PDSCHs associated with the one or more PDSCH grant types, selecting a number of feedback reports equal to the maximum number of bits allocated for the feedback information for the one or more PDSCHs associated with the one or more PDSCH grant types.

In a thirty-eighth aspect, in combination with the thirty-seventh aspect, the techniques further include, for each selected feedback report, including an ACK/NACK bit of the feedback report in the feedback information.

In a thirty-ninth aspect, in combination with the thirty-seventh aspect or the thirty-eighth aspect, the techniques further include, for a feedback report associated with the one or more PDSCH grant types other than one of the selected feedback reports, discarding or maintaining the feedback report.

In a fortieth aspect, in combination with the thirty-sixth aspect, the techniques further include, if the number of stored feedback reports associated with the one or more PDSCH grant types is less than or equal to a maximum number of bits allocated for the feedback information for the one or more PDSCHs associated with the one or more PDSCH grant types, for each stored feedback report associated with the one or more PDSCH grant types, including an ACK/NACK bit of the feedback report in the feedback information.

In a forty-first aspect, in combination with the fortieth aspect, the techniques further include determining a difference between the number of bits of the feedback information and the threshold.

In a forty-second aspect, in combination with the forty-first aspect, the techniques further include, for a first ACK/NACK bit of a first feedback report included in the feedback information, comparing a size of the CSI of the first feedback report and the difference.

In a forty-third aspect, in combination with the forty-second aspect, the techniques further include, if the size of the CSI of the first feedback report is less than or equal to the difference, including the CSI in the feedback information.

In a forty-fourth aspect, in combination with the forty-second aspect, the techniques further include, if the size of the CSI of the first feedback report is greater than the difference, initiating transmission of the feedback message.

In a forty-fifth aspect, in combination with the forty-second aspect, the techniques further include, if the size of the CSI of the first feedback report is greater than the difference, determining whether to include one or more bits based on the CSI of the first feedback report in the feedback information.

In a forty-sixth aspect, in combination with one or more of the fortieth aspect througth the forty-fifth aspect, the techniques further include, for each stored feedback report associated with the one or more PDSCH grant types for which the CSI of the stored feedback report was not included in the feedback information, discarding the CSI.

In a forty-seventh aspect, in combination with one or more of the first aspect through the forty-fifth aspect, when the one or more PDSCH grant types do not include a dynamic grant type, the feedback message includes dynamic grant feedback information for one or more received PDSCHs associated with the dynamic grant type, the dynamic grant feedback information distinct from the feedback information.

In a forty-eighth aspect, in combination with the twenty-sixth aspect, the techniques further include arranging a set of feedback reports for the one or more received PDSCHs associated with the one or more PDSCH grant types.

In a forty-ninth aspect, in combination with the forty-seventh aspect or the forty-eighth aspect, the techniques further include encoding the arranged set of feedback reports based on the threshold to generate the feedback information having a number of bits that is less than or equal to the threshold.

In a fiftieth aspect, in combination with the forty-eighth aspect or the forty-ninth aspect, the set of feedback reports is arranged based on priority information or based on a receive order associated with the set of feedback reports.

In a fifty-first aspect, in combination with one or more of the forty-eighth aspect through the fiftieth aspect, the techniques further include, when the one or more PDSCH grant types do not include a dynamic PDSCH grant type, arranging a feedback report for a received PDSCH associated with the dynamic PDSCH grant type prior to the set of feedback reports.

In a fifty-second aspect, in combination with one or more of the first aspect through the fifty-first aspect, the techniques further include receiving a first indicator that indicates the threshold.

In a fifty-third aspect, in combination with one or more of the first aspect through the fifty-second aspect, receiving a first indicator that indicates the threshold.

In a fifty-fourth aspect, in combination with the fifty-third aspect, the first indicator is included in an RRC message, an MAC-CE, or DCI.

In a fifty-fifth aspect, in combination with one or more of the first aspect through the fifty-fourth aspect, the techniques further include receiving a second indicator that indicates whether the one or more PDSCH grant types includes a SPS grant type or a SPS grant type and a dynamic grant type.

In a fifty-sixth aspect, in combination with the fifty-fifth aspect, the feedback information is generated based on the second indicator.

In a fifty-seventh aspect, in combination with the fifty-fifth aspect or the fifty-sixth aspect, the second indicator is included in an RRC message, an MAC-CE, or DCI.

In a fifty-eighth aspect, in combination with one or more of the first aspect through the fifty-seventh aspect, the techniques further include receiving a third indicator that indicates a format of the feedback information.

In a fifty-ninth aspect, in combination with the fifty-eighth aspect, the feedback information is generated based on the third indicator.

In a sixtieth aspect, in combination with the fifty-eighth aspect or the fifty-ninth aspect, the format indicates the feedback information is to be encoded using an encoding scheme.

In a sixty-first aspect, in combination with the sixtieth aspect, when the one or more received PDSCHs associated with the one or more PDSCH grant types includes multiple received PDSCHs each having a feedback report, the format indicates to arrange the feedback information as a series of feedback reports of the feedback reports of the multiple received PDSCHs.

In a sixty-second aspect, in combination with the sixtieth aspect, when the one or more received PDSCHs associated with the one or more PDSCH grant types includes multiple received PDSCHs each having a feedback report, the format indicates to arrange the feedback information as at least a first consecutive portion including ACK/NACK bits of the feedback reports of the multiple received PDSCHs.

In a sixty-third aspect, in combination with the sixty-second aspect, the format indicates to arrange the feedback information as a second consecutive portion of CSI of at least one feedback report of the feedback reports of the multiple received PDSCHs.

In a sixty-fourth aspect, in combination with one or more of the fifty-eighth aspect through the sixty-third aspect, the third indicator is included in an RRC message, an MAC-CE, or DCI.

In a sixty-fifth aspect, in combination with one or more of the first aspect through the sixty-third aspect, the techniques further include receiving a fourth indicator that indicates an encoding scheme.

In a sixty-sixth aspect, in combination with the sixty-fifth aspect, the feedback information is generated based on the fourth indicator.

In a sixty-seventh aspect, in combination with the sixty-fifth aspect or the sixty-sixth aspect, the fourth indicator is included in an RRC message or an MAC-CE.

In a sixty-eighth aspect, in combination with one or more of the first aspect through the sixty-seventh aspect, the techniques further include receiving a fifth indicator that indicates whether to, based on transmission of the feedback message, discard or maintain a stored feedback report of a received PDSCH, the feedback message generated independent of the stored feedback report.

In a sixty-ninth aspect, in combination with the sixty-eighth aspect, the feedback information is generated based on the fifth indicator.

In a seventieth aspect, in combination with one or more of sixty-eighth aspect or the sixty-ninth aspect, the fifth indicator is included in an RRC message, an MAC-CE, or DCI.

In a seventy-first aspect, in combination with one or more of the first aspect through the seventieth aspect, the techniques further include receiving a sixth indicator that indicates whether to discard one or more remaining available bits of the feedback information or to use the one or more remaining available bits to indicate at least a portion of a feedback report of a received PDSCH associated with the one or more PDSCH grant types.

In a seventy-second aspect, in combination with the seventy-first aspect, the feedback information is generated based on the sixth indicator.

In a seventy-third aspect, in combination with one or more of the seventy-first aspect or the seventy-second aspect, the sixth indicator is included in an RRC message, an MAC-CE, or DCI.

In some aspects, techniques for supporting feedback for mixed grant types may include additional aspects, such as any single aspect or any combination of aspects described below or in connection with one or more other processes or devices described elsewhere herein. In a seventy-fourth aspect, techniques for supporting feedback for mixed grant types may include determining a threshold associated with a number of bits for feedback of one or more PDSCH grant types. The techniques further include receiving a feedback message including feedback information for one or more PDSCHs associated with the one or more PDSCH grant types. A number of bits of the feedback information included in the feedback message for the one or more PDSCHs associated with the one or more PDSCH grant types is less than or equal to the threshold. In some examples, the techniques in the seventy-fourth aspect may be implemented in a method or process. In some other examples, the techniques of the seventy-fourth aspect may be implemented in a wireless communication device such as a receive device, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a seventy-fifth aspect, the threshold indicates a maximum number of bits allocated for the feedback information for the one or more PDSCHs associated with the one or more PDSCH grant types.

In a seventy-sixth aspect, in combination with the seventy-fourth aspect or the seventy-fifth aspect, the one or more PDSCH grant types include an SPS grant type.

In a seventy-seventh aspect, in combination with the seventy-sixth aspect, the one or more PDSCH grant types include multiple PDSCH grant types, and the multiple PDSCH grant types include a dynamic PDSCH grant type.

In a seventy-eighth aspect, in combination with one or more of the seventy-fourth aspect through the seventy-seventh aspect, the feedback message includes a PUCCH.

In a seventy-ninth aspect, in combination with one or more of the seventy-fourth aspect through the seventy-eighth aspect, the one or more PDSCHs include multiple PDSCHs.

In an eightieth aspect, in combination with the seventy-ninth aspect, the one or more PDSCH grant types include multiple PDSCH grant types, and the multiple PDSCHs are associated with the multiple PDSCH grant types.

In an eighty-first aspect, in combination with the eightieth aspect, the multiple PDSCH grant types include a dynamic PDSCH grant type, a first SPS grant type having first configuration, a second SPS grant type having a second configuration, or a combination thereof.

In an eighty-second aspect, in combination with one or more of the seventy-fourth aspect through the eighty-first aspect, the feedback information includes one or more ACK/NACK bits, CSI, encoded data, or a combination thereof.

In an eighty-third aspect, in combination with the eighty-second aspect, the channel state information includes a CQI, channel rank information, power information, a BLER, a BER, or a combination thereof.

In an eighty-fourth aspect, in combination with the eighty-second aspect, the feedback information includes HARQ-ACK feedback information.

In an eighty-fifth aspect, in combination with one or more of the seventy-fourth aspect through the eighty-fourth aspect, the techniques further including initiating transmission of or transmitting priority information associated with the one or more PDSCH grant types.

In an eighty-sixth aspect, in combination with the eighty-fifth aspect, a dynamic PDSCH grant type has a highest priority, a first SPS grant type including a first configuration has a second highest priority, a second SPS grant type including a second configuration has a third highest priority, or a combination thereof.

In an eighty-seventh aspect, in combination with one or more of the seventy-fourth aspect through the eighty-sixth aspect, the techniques further including initiating transmission of or transmitting the one or more PDSCHs.

In an eighty-eighth aspect, in combination with one or more of the seventy-fourth aspect through the eighty-seventh aspect, the feedback information for the one or more PDSCHs associated with the one or more PDSCH grant types is generated based on a set of feedback reports for the one or more PDSCHs associated with the one or more PDSCH grant types.

In an eighty-ninth aspect, in combination with one or more of the seventy-fourth aspect through the eighty-eighth aspect, when the one or more PDSCH grant types do not include a dynamic grant type, the feedback message includes dynamic grant feedback information for one or more PDSCHs associated with the dynamic grant type, the dynamic grant feedback information distinct from the feedback information.

In a ninetieth aspect, in combination with one or more of the seventy-fourth aspect through the eighty-ninth aspect, the techniques further including parsing the feedback information.

In a ninety-first aspect, in combination with the ninetieth aspect, the techniques further including determining, for each of the one or more PDSCHs associated with the one or more PDSCH grant types, an ACK/NACK status, channel state information, or a combination thereof.

In a ninety-second aspect, in combination with one or more of the seventy-fourth aspect through the ninety-first aspect, the techniques further including decoding at least a portion of the feedback information based on an encoding scheme.

In a ninety-third aspect, in combination with one or more of the seventy-fourth aspect through the ninety-second aspect, the techniques further including initiating transmission of or transmitting multiple PDSCHs and store tracking information of the transmitted multiple PDSCHs.

In a ninety-fourth aspect, in combination with the ninety-third aspect, the tracking information generated according to priority information for multiple PDSCH grant types.

In a ninety-fifth aspect, in combination with one or more of the seventy-fourth aspect through the ninety-fourth aspect, the techniques further including initiating transmission of or transmitting a feedback configuration associated with the one or more PDSCH grant types.

In a ninety-sixth aspect, in combination with the ninety-fifth aspect, the feedback configuration indicates the threshold.

In a ninety-seventh aspect, in combination with one or more of the seventy-fourth aspect through the ninety-sixth aspect, the techniques further including initiating transmission of or transmitting one or more indicators associated with a feedback configuration.

In a ninety-eighth aspect, in combination with the ninety-seventh aspect, the feedback configuration is associated with the one or more PDSCH grant types.

In a ninety-ninth aspect, in combination with the ninety-seventh aspect or the ninety-eighth aspect, the techniques further including processing the feedback information based on the one or more indicators, the feedback configuration, or a combination thereof.

In a one hundredth aspect, in combination with one or more of the seventy-fourth aspect through the ninety-ninth aspect, the techniques further including determining a first indicator and transmit the first indicator that indicates the threshold.

In a one hundred and first aspect, in combination with the one hundredth aspect, the feedback information is generated based on the first indicator.

In a one hundred and second aspect, in combination with the one hundredth aspect through the one hundred and first aspect, the first indicator is included in an RRC message, an MAC-CE, or DCI.

In a one hundred and third aspect, in combination with one or more of the seventy-fourth aspect through the one hundred and second aspect, the techniques further including initiating transmission of or transmitting a second indicator that indicates whether the one or more PDSCH grant types includes an SPS grant type or a SPS grant type and a dynamic grant type In a one hundred and fourth aspect, in combination with the one hundred and third aspect, the feedback information is generated based on the second indicator.

In a one hundred and fifth aspect, in combination with the one hundred and third aspect or the one hundred and fourth aspect, the second indicator is included in an RRC message, an MAC-CE, or DCI.

In a one hundred and sixth aspect, in combination with one or more of the seventy-fourth aspect through one hundred and fifth aspect, the techniques further including initiating transmission of or transmitting a third indicator that indicates a format of the feedback information.

In a one hundred and seventh aspect, in combination with the one hundred and sixth aspect, the feedback information is generated based on the third indicator.

In a one hundred and eighth aspect, in combination with the one hundred and sixth aspect or the one hundred and seventh aspect, the format indicates the feedback information is to be encoded using an encoding scheme.

In a one hundred and ninth aspect, in combination with the one hundred and sixth aspect or the one hundred and seventh aspect, when the one or more PDSCHs associated with the one or more PDSCH grant types includes multiple PDSCHs each having a feedback report, the format indicates an arrangement of the feedback information as a series of feedback reports of the feedback reports of the multiple PDSCHs.

In a one hundred and tenth aspect, in combination with the one hundred and sixth aspect or the one hundred and seventh aspect, when the one or more PDSCHs associated with the one or more PDSCH grant types includes multiple PDSCHs each having a feedback report, the format indicates an arrangement of the feedback information as at least a first consecutive portion including ACK/NACK bits of the feedback reports of the multiple PDSCHs.

In a one hundred and eleventh aspect, in combination with the one hundred and tenth aspect, the format indicates an arrangement of the feedback information as a second consecutive portion of CSI of at least one feedback report of the feedback reports of the multiple PDSCHs.

In a one hundred and twelfth aspect, in combination with one or more of the one hundred and sixth aspect through the one hundred and eleventh aspect, the third indicator is included in an RRC message, an MAC-CE, or DCI.

In a one hundred and thirteenth aspect, in combination with one or more of the seventy-fourth aspect through the one hundred and twelfth aspect, the techniques further including initiating transmission of or transmitting a fourth indicator that indicates an encoding scheme.

In a one hundred and fourteenth aspect, in combination with the one hundred and thirteenth aspect, the feedback information is generated based on the fourth indicator.

In a one hundred and fifteenth aspect, in combination with the one hundred and thirteenth aspect or the one hundred and fourteenth aspect, the fourth indicator is included in an RRC message or an MAC-CE.

In a one hundred and sixteenth aspect, in combination with one or more of the seventy-fourth aspect through the one hundred and fifteenth aspect, the techniques further including initiating transmission of or transmitting a fifth indicator that indicates whether to, based on transmission of the feedback message, discard or maintain a stored feedback report of a PDSCH, the feedback message generated independent of the stored feedback report.

In a one hundred and seventeenth aspect, in combination with the one hundred and sixteenth aspect, the feedback information is generated based on the fifth indicator.

In a one hundred and eighteenth aspect, in combination with the one hundred and sixteenth aspect or the one hundred and seventeenth aspect, the fifth indicator is included in an RRC message, an MAC-CE, or DCI.

In a one hundred and nineteenth aspect, in combination with one or more of the seventy-fourth aspect through the one hundred and eighteenth aspect, the techniques further including initiating transmission of or transmitting a sixth indicator that indicates whether to discard one or more remaining available bits of the feedback information or to use the one or more remaining available bits to indicate at least a portion of a feedback report of a PDSCH associated with the one or more PDSCH grant types.

In a one hundred and twentieth aspect, in combination with the one hundred and nineteenth aspect, the feedback information is generated based on the sixth indicator.

In a one hundred and twenty-first aspect, in combination with the one hundred and nineteenth aspect or the one hundred and twentieth aspect, the sixth indicator is included in an RRC message, an MAC-CE, or DCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving a configuration message that includes a feedback configuration associated with one or more physical downlink shared channel (PDSCH) grant types, the feedback configuration including an indicator indicating that the one or more PDSCH grant types includes a semi-persistent scheduling (SPS) grant type;
   determining, based on the feedback configuration, a threshold associated with a number of bits for feedback of the one or more PDSCH grant types; and
   transmitting a feedback message including feedback information for one or more received PDSCHs associated with the one or more PDSCH grant types, a number of bits of the feedback information included in the feedback message for the one or more received PDSCHs associated with the one or more PDSCH grant types is less than or equal to the threshold.

2. The method of claim 1, wherein the feedback message includes a physical uplink control channel (PUCCH), the method further comprising:
   generating the feedback information based on the threshold;
   wherein:
      the threshold indicates a maximum number of bits allocated for the feedback information for the one or more received PDSCHs associated with the one or more PDSCH grant types; or
      the one or more PDSCH grant types include a semi-persistent scheduling (SPS) grant type.

3. The method of claim 1, wherein
   the one or more received PDSCHs include multiple PDSCHs, the one or more PDSCH grant types include multiple PDSCH grant types, and the multiple PDSCHs are associated with the multiple PDSCH grant types, and the multiple PDSCH grant types include a dynamic PDSCH grant type, a first semi-persistent scheduling (SPS) grant type having first configuration, a second SPS grant type having a second configuration, or a combination thereof.

4. The method of claim 1, wherein:
   the feedback information includes one or more acknowledgement/negative-acknowledgement (ACK/NACK) bits, channel state information (CSI), or a combination thereof; and
   the channel state information includes a channel quality indicator (CQI), channel rank information, power information, a block error rate (BLER), a bit error rate (BER), or a combination thereof.

5. The method of claim 1,
   wherein each feedback report includes an acknowledgement/negative-acknowledgement (ACK/NACK) status, channel state information, or a combination thereof and wherein the method further comprises:
   storing the feedback report, wherein, for each received PDSCH of the one or more received PDSCHs, the feedback report for the PDSCH is stored based on a PDSCH grant type associated with the PDSCH, priority information associated with multiple PDSCH grant types, a reception time of the PDSCH, or a combination thereof.

6. The method of claim 1, further comprising:
receiving priority information associated with the one or more PDSCH grant types;
arranging multiple feedback reports based on the priority information; and
wherein the feedback information for the one or more received PDSCHs associated with the one or more PDSCH grant types is generated based on a set of feedback reports of the multiple feedback reports for the one or more received PDSCHs associated with the one or more PDSCH grant types.

7. The method of claim 1, further comprising:
selecting a first feedback report for the one or more received PDSCHs associated with the one or more PDSCH grant types;
generating the feedback information to include the first feedback report;
determining whether a number of bits of the feedback information including the first feedback report is less than or equal to the threshold; and
based on a determination that the number of bits of the feedback information is less than the threshold, determining a difference between the number of bits of the feedback information and the threshold.

8. The method of claim 7, further comprising:
based on a determination that the difference is greater than or equal to a size of a second feedback report of a received PDSCH associated with the one or more PDSCH grant types, including the second feedback report in the feedback information; or
based on a determination that the difference is less than a size of a second feedback report of a received PDSCH associated with the one or more PDSCH grant types:
if the difference is equal to one, including acknowledgement/negative-acknowledgement (ACK/NACK) bit of a second feedback report in the feedback information; or
if the difference is greater than one:
including an ACK/NACK bit of a second feedback report in the feedback information; and
determining whether to include one or more bits based on channel state information (CSI) of the second feedback report in the feedback information.

9. The method of claim 1, further comprising:
determining a number of stored feedback reports associated with the one or more PDSCH grant types; and
if the number of stored feedback reports associated with the one or more PDSCH grant types is greater than a maximum number of bits allocated for the feedback information for the one or more received PDSCHs associated with the one or more PDSCH grant types:
selecting a number of feedback reports equal to the maximum number of bits allocated for the feedback information for the one or more received PDSCHs associated with the one or more PDSCH grant types; and
for each selected feedback report, including an acknowledgement/negative-acknowledgement (ACK/NACK) bit of the selected feedback report in the feedback information; or if the number of stored feedback reports associated with the one or more PDSCH grant types is less than or equal to a maximum number of bits allocated for the feedback information for the one or more received PDSCHs associated with the one or more PDSCH grant types:
for each stored feedback report associated with the one or more PDSCH grant types, including an acknowledgement/negative-acknowledgement (ACK/NACK) bit of the stored feedback report in the feedback information;
determining a difference between the number of bits of the feedback information and the threshold;
for a first ACK/NACK bit of a first feedback report included in the feedback information, comparing a size of channel state information (CSI) of the first feedback report and the difference; and
if the size of the CSI of the first feedback report is less than or equal to the difference, including the CSI in the feedback information; or
if the size of the CSI of the first feedback report is greater than the difference:
initiating transmission of the feedback message; or
determining whether to include one or more bits based on the CSI of the first feedback report in the feedback information.

10. The method of claim 1, further comprising:
arranging a set of feedback reports for the one or more received PDSCHs associated with the one or more PDSCH grant types, wherein the set of feedback reports is arranged based on priority information or based on a receive order associated with the set of feedback reports; and
encoding the arranged set of feedback reports based on the threshold to generate the feedback information having a number of bits that is less than or equal to the threshold.

11. The method of claim 1, wherein the configuration message is received in a radio resource control (RRC) message, a medium access control-control element (MAC-CE), or downlink control information (DCI) that includes one or more indicators, the one or more indicators including, in addition to the indicator:
a second indicator that indicates the threshold;
a third indicator that indicates that the one or more PDSCH grant types further include a dynamic grant type;
a fourth indicator that indicates a format of the feedback information;
a fifth indicator that indicates an encoding scheme;
a sixth indicator that indicates whether to, based on transmission of the feedback message, discard or maintain a stored feedback report of a received PDSCH, the feedback message generated independent of the stored feedback report; and
a seventh indicator that indicates whether to discard one or more remaining available bits of the feedback information or to use the one or more remaining available bits to indicate at least a portion of a feedback report of a received PDSCH associated with the one or more PDSCH grant types; and
wherein the feedback information is generated based on the second indicator.

12. The method of claim 1, further comprising:
for each received PDSCH of the one or more received PDSCHs:
generating a feedback report for the PDSCH, and arranging multiple feedback reports based on priority information associated with the one or more PDSCH grant types.

13. A user equipment (UE) comprising:
at least one processor; and
a memory coupled with the at least one processor and storing processor-readable code that, when executed by the at least one processor, is configured to:
receive a configuration message that includes a feedback configuration associated with one or more physical downlink shared channel (PDSCH) grant types, the feedback configuration including an indicator indicating that the one or more PDSCH grant types includes a semi-persistent scheduling (SPS) grant type;
determine, based on the feedback configuration, a threshold associated with a number of bits for feedback of the one or more PDSCH grant types; and
initiate transmission of a feedback message including feedback information for one or more received PDSCHs associated with the one or more PDSCH grant types, a number of bits of the feedback information included in the feedback message for the one or more received PDSCHs associated with the one or more PDSCH grant types is less than or equal to the threshold.

14. The UE of claim 13, wherein the feedback message includes a physical uplink control channel (PUCCH), and wherein the processor-readable code, when executed by the at least one processor, is further configured to:
generate the feedback information based on the threshold;
wherein:
the threshold indicates a maximum number of bits allocated for the feedback information for the one or more received PDSCHs associated with the one or more PDSCH grant types; or
the one or more PDSCH grant types include a semi-persistent scheduling (SPS) grant type.

15. The UE of claim 13, wherein:
the one or more received PDSCHs include multiple PDSCHs, the one or more PDSCH grant types include multiple PDSCH grant types, and the multiple PDSCHs are associated with the multiple PDSCH grant types, and the multiple PDSCH grant types include a dynamic PDSCH grant type, a first semi-persistent scheduling (SPS) grant type having first configuration, a second SPS grant type having a second configuration, or a combination thereof.

16. The UE of claim 13, wherein:
the feedback information includes one or more acknowledgement/negative-acknowledgement (ACK/NACK) bits, channel state information (CSI), or a combination thereof; and
the channel state information includes a channel quality indicator (CQI), channel rank information, power information, a block error rate (BLER), a bit error rate (BER), or a combination thereof.

17. The UE of claim 13,
wherein each feedback report includes an acknowledgement/negative-acknowledgement (ACK/NACK) status, channel state information, or a combination thereof and wherein the processor-readable code, when executed by the at least one processor, is further configured to:
store the feedback report, wherein, for each received PDSCH of the one or more received PDSCHs, the feedback report for the PDSCH is stored based on a PDSCH grant type associated with the PDSCH, priority information associated with multiple PDSCH grant types, a reception time of the PDSCH, or a combination thereof.

18. The UE of claim 13, wherein the processor-readable code, when executed by the at least one processor, is further configured to:
receive priority information associated with the one or more PDSCH grant types;
arrange multiple feedback reports based on the received priority information; and
wherein the feedback information for the one or more received PDSCHs associated with the one or more PDSCH grant types is generated based on a set of feedback reports of the multiple feedback reports for the one or more received PDSCHs associated with the one or more PDSCH grant types.

19. The UE of claim 13, wherein the processor-readable code, when executed by the at least one processor, is further configured to:
select a first feedback report for the one or more received PDSCHs associated with the one or more PDSCH grant types;
generate the feedback information to include the first feedback report;
determine whether a number of bits of the feedback information including the first feedback report is less than or equal to the threshold; and
based on a determination that the number of bits of the feedback information is less than the threshold, determine a difference between the number of bits of the feedback information and the threshold.

20. The UE of claim 13, wherein the processor-readable code, when executed by the at least one processor, is further configured to:
determine a number of stored feedback reports associated with the one or more PDSCH grant types; and
if the number of stored feedback reports associated with the one or more PDSCH grant types is greater than a maximum number of bits allocated for the feedback information for the one or more received PDSCHs associated with the one or more PDSCH grant types:
select a number of feedback reports equal to the maximum number of bits allocated for the feedback information for the one or more received PDSCHs associated with the one or more PDSCH grant types; and
for each selected feedback report, include an acknowledgement/negative-acknowledgement (ACK/NACK) bit of the selected feedback report in the feedback information; or
if the number of stored feedback reports associated with the one or more PDSCH grant types is less than or equal to a maximum number of bits allocated for the feedback information for the one or more received PDSCHs associated with the one or more PDSCH grant types:
for each stored feedback report associated with the one or more PDSCH grant types, include an acknowledgement/negative-acknowledgement (ACK/NACK) bit of the stored feedback report in the feedback information;
determine a difference between the number of bits of the feedback information and the threshold;
for a first ACK/NACK bit of a first feedback report included in the feedback information, compare a size of channel state information (CSI) of the first feedback report and the difference; and
if the size of the CSI of the first feedback report is less than or equal to the difference, include the CSI in the feedback information; or
if the size of the CSI of the first feedback report is greater than the difference:
initiate transmission of the feedback message; or
determine whether to include one or more bits based on the CSI of the first feedback report in the feedback information.

21. The UE of claim 13, wherein the processor-readable code, when executed by the at least one processor, is further configured to:
arrange a set of feedback reports for the one or more received PDSCHs associated with the one or more PDSCH grant types, wherein the set of feedback reports is arranged based on priority information or based on a receive order associated with the set of feedback reports; and
encode the arranged set of feedback reports based on the threshold to generate the feedback information having a number of bits that is less than or equal to the threshold.

22. The user equipment of claim 13, wherein, the processor-readable code, when executed by the at least one processor, is further configured to:
for each received PDSCH of the one or more received PDSCHs:
generate a feedback report for the PDSCH, and
arrange multiple feedback reports based on priority information associated with the one or more PDSCH grant types.

23. A method of wireless communication performed by a base station, the method comprising:
determining a threshold associated with a number of bits for feedback of one or more physical downlink shared channel (PDSCH) grant types;
transmitting a configuration message that includes a feedback configuration associated with the one or more PDSCH grant types, the feedback configuration including an indicator indicating that the one or more PDSCH grant types includes a semi-persistent scheduling (SPS) grant type; and
receiving a feedback message including feedback information for one or more PDSCHs associated with the one or more PDSCH grant types, a number of bits of the feedback information included in the feedback message for the one or more PDSCHs associated with the one or more PDSCH grant types is less than or equal to the threshold.

24. The method of claim 23, wherein:
the threshold indicates a maximum number of bits allocated for the feedback information for the one or more PDSCHs associated with the one or more PDSCH grant types;
the one or more PDSCH grant types include multiple PDSCH grant types, and the multiple PDSCH grant types include a dynamic PDSCH grant type in addition to the SPS grant type; and
the feedback message includes a physical uplink control channel (PUCCH).

25. The method of claim 23, wherein:
the one or more PDSCHs include multiple PDSCHs, the one or more PDSCH grant types include multiple PDSCH grant types, and the multiple PDSCHs are associated with the multiple PDSCH grant types;
the multiple PDSCH grant types include a dynamic PDSCH grant type, a first semi-persistent scheduling (SPS) grant type having first configuration, a second SPS grant type having a second configuration, or a combination thereof; and
the feedback information includes one or more acknowledgement/negative-acknowledgement (ACK/NACK) bits, channel state information (CSI), encoded data, or a combination thereof.

26. The method of claim 23, further comprising:
transmitting priority information associated with the one or more PDSCH grant types; and
transmitting the one or more PDSCHs.

27. The method of claim 23, further comprising:
transmitting multiple PDSCHs;
storing tracking information of the transmitted multiple PDSCHs, the tracking information generated according to priority information for multiple PDSCH grant types;
parsing the feedback information;
decoding at least a portion of the feedback information based on an encoding scheme; and
determining, for each of the one or more PDSCHs associated with the one or more PDSCH grant types, an acknowledgement/negative-acknowledgement (ACK/NACK) status, channel state information, or a combination thereof.

28. A base station comprising:
at least one processor; and
a memory coupled with the at least one processor and storing processor-readable code that, when executed by the at least one processor, is configured to:
determine a threshold associated with a number of bits for feedback of one or more physical downlink shared channel (PDSCH) grant types;
transmit a configuration message that includes a feedback configuration associated with the one or more PDSCH grant types, the feedback configuration including an indicator indicating that the one or more PDSCH grant types includes a semi-persistent scheduling (SPS) grant type; and
receive a feedback message including feedback information for the one or more PDSCHs associated with the one or more PDSCH grant types, a number of bits of the feedback information included in the feedback message for the one or more PDSCHs associated with the one or more PDSCH grant types is less than or equal to the threshold.

29. The base station of claim 28, wherein:
the threshold indicates a maximum number of bits allocated for the feedback information for the one or more PDSCHs associated with the one or more PDSCH grant types;
the one or more PDSCH grant types include multiple PDSCH grant types, and the multiple PDSCH grant types include a dynamic PDSCH grant type in addition to the SPS grant type; and
the feedback message includes a physical uplink control channel (PUCCH).

30. The base station of claim 28, wherein:
the one or more PDSCHs include multiple PDSCHs, the one or more PDSCH grant types include multiple PDSCH grant types, and the multiple PDSCHs are associated with the multiple PDSCH grant types;
the multiple PDSCH grant types include a dynamic PDSCH grant type, a first semi-persistent scheduling (SPS) grant type having first configuration, a second SPS grant type having a second configuration, or a combination thereof; and the feedback information includes one or more acknowledgement/negative-acknowledgement (ACK/NACK) bits, channel state information (CSI), encoded data, or a combination thereof.

* * * * *